United States Patent
Nishiwaki

(10) Patent No.: US 8,573,069 B2
(45) Date of Patent: Nov. 5, 2013

(54) STRESS SENSING DEVICE, TACTILE SENSOR, AND GRASPING APPARATUS

(75) Inventor: Tsutomu Nishiwaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 358 days.

(21) Appl. No.: 13/022,969

(22) Filed: Feb. 8, 2011

(65) Prior Publication Data

US 2011/0193363 A1   Aug. 11, 2011

(30) Foreign Application Priority Data

Feb. 10, 2010   (JP) .................................. 2010-027325

(51) Int. Cl.
*G01L 1/22*   (2006.01)
*G01L 1/04*   (2006.01)

(52) U.S. Cl.
USPC ............ 73/862.474; 73/862.471; 73/862.044; 73/862.451; 73/862.381

(58) Field of Classification Search
USPC ....................... 73/862.044, 862.045, 862.381, 73/862.391, 862.451, 862.471, 862.474
See application file for complete search history.

(56) References Cited

U.S. PATENT DOCUMENTS

| | | | | |
|---|---|---|---|---|
| 3,918,019 A | * | 11/1975 | Nunn | 338/42 |
| 4,079,508 A | * | 3/1978 | Nunn | 438/51 |
| 4,991,283 A | * | 2/1991 | Johnson et al. | 29/595 |
| 5,264,820 A | * | 11/1993 | Kovacich et al. | 338/42 |
| 5,589,810 A | * | 12/1996 | Fung | 338/4 |
| 5,861,558 A | * | 1/1999 | Buhl et al. | 73/777 |
| 6,056,888 A | * | 5/2000 | August | 216/16 |
| 7,669,480 B2 | | 3/2010 | Maekawa | |
| 8,297,125 B2 | * | 10/2012 | Stewart et al. | 73/716 |
| 8,359,931 B2 | * | 1/2013 | Nishiwaki | 73/846 |
| 2005/0186703 A1 | * | 8/2005 | Weiblen et al. | 438/106 |
| 2008/0105057 A1 | * | 5/2008 | Wade | 73/721 |
| 2012/0144924 A1 | * | 6/2012 | Kotovsky | 73/777 |
| 2012/0319418 A1 | * | 12/2012 | Nishiwaki | 294/207 |

FOREIGN PATENT DOCUMENTS

| | | |
|---|---|---|
| JP | 2000-254884 A | 9/2000 |
| JP | 2006-208248 A | 8/2006 |
| JP | 2006-275979 A | 10/2006 |
| JP | 2010-164331 A | 7/2010 |
| JP | 2010-165028 A | 7/2010 |
| JP | 2010-165029 A | 7/2010 |
| JP | 2010-218365 A | 9/2010 |

* cited by examiner

*Primary Examiner* — Lisa Caputo
*Assistant Examiner* — Jonathan Dunlap
(74) *Attorney, Agent, or Firm* — Global IP Counselors, LLP

(57) ABSTRACT

A stress sensing device senses a shear force and a pressing force. The stress sensing device includes a support body, a support film, first and second piezoelectric parts and an elastic layer. The support body has an opening defined by a pair of straight parts perpendicular to a sensing direction of the shear force and parallel to each other. The support film having flexibility closes off the opening. The first piezoelectric part is disposed over the support film and straddling an inside portion and an outside portion of the opening along at least one of the straight parts of the opening as seen in plan view. The second piezoelectric part is disposed to the inside portion of the opening and set apart from the first piezoelectric part as seen in the plan view. The elastic layer covers the first piezoelectric part, the second piezoelectric part, and the support film.

9 Claims, 15 Drawing Sheets

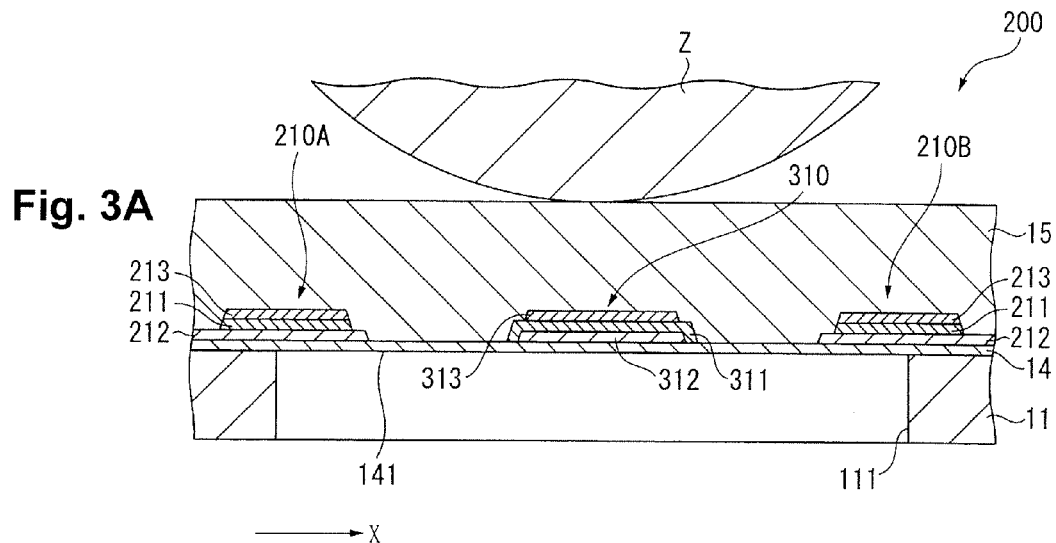
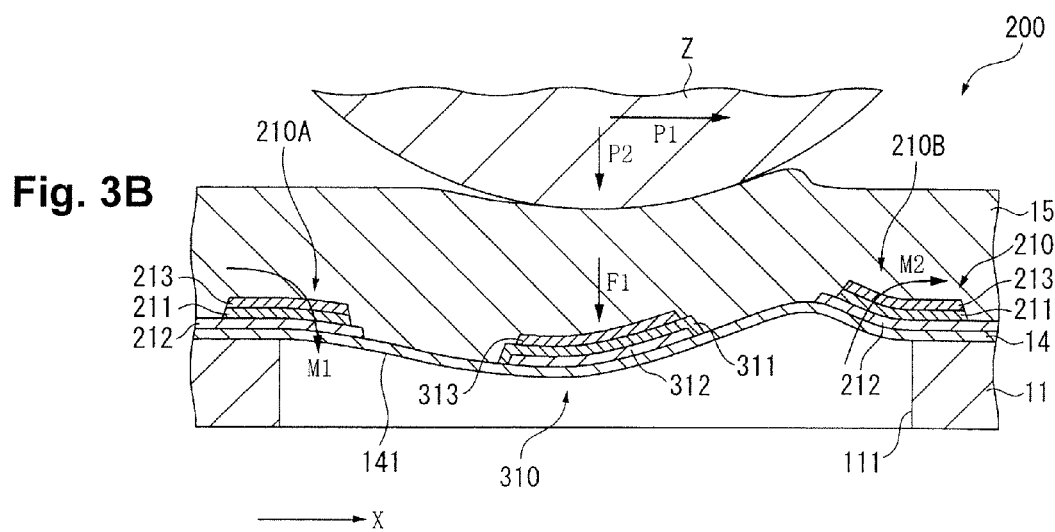

|  | SHEAR FORCE SENSING PIEZOELECTRIC BODY 210A | PRESSING FORCE SENSING PIEZOELECTRIC BODY 310 | SHEAR FORCE SENSING PIEZOELECTRIC BODY 210B |
| --- | --- | --- | --- |
| (i) +X DIRECTION SHEARING | + + | - | - - |
| (ii) -X DIRECTION SHEARING | - - | - | + + |
| (iii) PRESSING | - | - - | - |

Fig. 5

STRESS SENSING DEVICE, TACTILE SENSOR, AND GRASPING APPARATUS

CROSS-REFERENCE TO RELATED APPLICATIONS

This application claims priority to Japanese Patent Application No. 2010-027325 filed on Feb. 10, 2010. The entire disclosure of Japanese Patent Application No. 2010-027325 is hereby incorporated herein by reference.

BACKGROUND

1. Technical Field

The present invention relates to a stress sensing device adapted to sense both shear force acting in a shear direction and pressing force acting in a direction perpendicular to a shear direction; to a tactile sensor furnished with this stress sensing device; and to a grasping apparatus furnished with this tactile sensor.

2. Related Art

Grasping apparatus designed to grasp and pick up objects of unknown weight or coefficient of friction by a robot arm, a robot hand, a robot manipulator or the like are known in the art. In a grasping apparatus of this kind, in order to grasp an object without breaking it and without letting the object slip and drop, it is necessary to sense force acting in the direction perpendicular to a grasped face (pressing force), as well as force acting in the planar direction (shear direction) of the grasped face (shear force). Sensors adapted to sense such forces are known in the art (see Japanese Laid-Open Patent Application 2006-208248, for example).

The tactile sensor disclosed in Japanese Laid-Open Patent Application 2006-208248 has structures of cantilever construction extending from the edge of an opening provided to the sensor substrate. Each of these structures is composed of a sensing portion of flat plate shape, and a hinge portion linking the sensing portion with the sensor substrate. A conductive magnetic film is formed in the sensing portion of this structure and a piezoresistive film is formed in the hinge portion, with the conductive magnetic film and the piezoresistive film having electrical continuity. Additionally, an electrode is disposed in the hinge portion, providing a configuration whereby electrical current, generated by piezoresistance of the hinge portion when the hinge portion bends due to pressure, flows from the electrode. The tactile sensor has a plurality of structures like those described above formed on the sensor substrate, with some of these structures oriented upright with respect to the sensor substrate, while others are held parallel to the sensor substrate. An elastomer is disposed on the sensor substrate, and the upright structures are embedded into the elastomer. Shear force can be measured by the upright structures, while pressing force can be measured by the structures parallel to the substrate face. With this tactile sensor, shear force is sensed by the structures that are upright with respect to the sensor substrate, and pressing force is sensed by the structures that are held parallel to the sensor substrate.

SUMMARY

With the tactile sensor disclosed in Japanese Laid-Open Patent Application 2006-208248, the structures that are upright with respect to the sensor substrate and the structures that are held parallel to the sensor substrate are separate, and shear force is sensed by the upright structures whereas pressing force is sensed by the structures parallel to the sensor substrate. However, where the structures for sensing shear force and the structures for sensing pressing force are formed in separate regions in this way, a resultant problem is larger sensor size unsuited to production of small-scale tactile sensors.

Moreover, with the tactile sensor of Japanese Laid-Open Patent Application 2006-208248, for any single given point, either shear force or pressing force can be sensed, but not both. For example, a structure for sensing shear force senses shear force only, whereas pressing force is sensed by a structure for sensing pressing force that is situated in proximity to this structure. Therefore, a resultant problem is that pressing force acting on a location where a structure for sensing shear force is disposed cannot be sensed accurately.

With the foregoing in view, it is an object of the present invention to provide a stress sensing device, a tactile sensor, and a grasping apparatus adaptable to compact design, and capable of accurately sensing shear force and pressing force.

A stress sensing device according to a first aspect of the present invention is an element for sensing a shear force acting in a shear direction and a pressing force perpendicular to the shear direction. The stress sensing device includes a support body, a support film, a first piezoelectric part, a second piezoelectric part and an elastic layer. The support body has an opening defined by a pair of straight parts perpendicular to a sensing direction of the shear force and parallel to each other. The support film is formed on the support body and closing the opening, the support film having flexibility. The first piezoelectric part is configured to output an electrical signal by bending, the first piezoelectric part being disposed over the support film and straddling an inside portion and an outside portion of the opening along at least one of the straight parts of the opening as seen in plan view when the support body is viewed from a thickness direction of the support film. The second piezoelectric part is configured to output an electrical signal by bending, the second piezoelectric part being disposed to the inside portion of the opening and set apart from the first piezoelectric part as seen in the plan view. The elastic layer covers the first piezoelectric part, the second piezoelectric part, and the support film.

According to the present invention, the stress sensing device is produced by forming a support film on the support body so as to close the opening; laminating a first piezoelectric part over the support film so as to bridge the inside and outside of the opening; laminating a second piezoelectric part to the inside of the opening; and then laminating an elastic layer over the top thereof. In the description hereinbelow, the region of the support film situated within the opening is termed the membrane.

With this stress sensing device, when an object comes into contact with the elastic layer and shear force is applied in a direction perpendicular to the linear direction of a straight part of the opening (the sensing direction of the shear force), strain is created in the elastic layer and in the support film. This strain of the elastic layer gives rise to flexion of the membrane as a whole, and an electrical signal is output from the first piezoelectric part. When an object has come into contact with the elastic layer and applied pressing force in the thickness direction perpendicular to the membrane, the elastic layer and the support film experience flexion in the thickness direction, whereby an electrical signal is output from the second piezoelectric part.

In this regard, where separate elements are provided in order to detect shear force and pressing force, it is not possible to accurately sense pressing force applied at a location where a shear force sensor is disposed or shear force applied at a location where a pressing force sensor is disposed, for example. In contrast to this, by disposing a first piezoelectric part for sensing shear force and a second piezoelectric part for sensing pressing force on a single membrane as described above, it is possible to accurately sense both shear force and the pressing force acting on this membrane.

Moreover, where elements for sensing shear force and elements for sensing pressing force are respectively formed as separate elements, it is necessary to ensure space equivalent to two elements in order to configure a sensor for sensing shear force and pressing force, resulting in large sensor size. According to the present invention on the other hand, it is possible to sense both shear force and pressing force within space equivalent to a single element, and to keep sensor size smaller.

In the stress sensing device according to another aspect, the opening may include a pair of first straight parts and a pair of second straight parts perpendicular to the first straight parts, and the first piezoelectric parts may be disposed respectively along at least one of the first straight parts and at least one of the second straight parts.

According to the present invention, shear force acting in a first shear force perpendicular to the first straight parts can be detected by the first piezoelectric part situated at a first straight part, and shear force acting in a second shear force direction perpendicular to the second straight parts can be detected by the first piezoelectric part situated at a second straight part. Therefore, all manner of shear forces acting within the plane of the membrane can be detected by a single stress sensing device.

In the stress sensing device according to another aspect, the first piezoelectric parts may be disposed respectively along each of the pair of the straight parts.

When an object comes into contact with the elastic layer and shear force is applied, designating one of the pair of straight parts of the opening as the first side and the other as the second side, if, for example shear force is applied in a sensing direction from the first side towards the second side, forces such as the following will act on the elastic layer. Specifically, at the second side of the elastic layer, uplift force directed in the opposite direction from the one face where the support body is disposed is generated, whereas at the first side, thrusting force into the opening of the support body is generated. Consequently, by providing a first piezoelectric part at both the first side and second side, shear force traveling in a shear direction can be detected by these two first piezoelectric parts, shear force can be sensed at greater signal values (current values) as compared with when shear force is sensed by a single first piezoelectric part, and sensing accuracy may be improved.

Likewise, where a pair of first straight parts and a pair of second straight parts perpendicular to the first straight parts are provided, by disposing first piezoelectric parts along the pair of first straight parts and the pair of second straight parts respectively, first shear force perpendicular to the first straight parts and second shear force perpendicular to the second straight parts can be sensed at greater signal values, and sensing accuracy of these shear forces may be improved.

In the stress sensing device according to another aspect, the second piezoelectric part may be disposed at the center of the opening viewed in the plan view, and on the support film, support beams are disposed respectively at locations that, when viewed in the plan view, may be symmetrically disposed with respect to a line segment which passes through the center of the second piezoelectric part and extends parallel to the sensing direction of the shear force.

According to the present invention, at least one pair of support beams for supporting the second piezoelectric part are disposed at axisymmetrical locations with respect to a line segment which passes through the center of the first piezoelectric part and extends parallel to the sensing direction of the shear force. Therefore, when stress is applied to the elastic layer, the membrane experiences uniform flexion, and shear force and pressing force can be sensed with better accuracy.

In the stress sensing device according to another aspect, the opening may be formed in a rectangular shape, and the support beams may be formed on diagonal lines of the opening.

According to this invention, the support beams are respectively formed along diagonal lines of the rectangular opening. Designating mutually opposing sides of the opening respectively as the first side and the second side, and when shear force is applied along the sensing direction of the shear force from the first side towards the second side, it is possible to accurately sense the shear force through flexion of the membrane in a substantially sinusoidal wave profile along the sensing direction of the shear force. Here, if, for example the support beams of the second piezoelectric part were formed axisymmetrically with respect to the line segment towards the ends of the first side, for example, these support beams would be able to impart a uniform degree of flexion of the membrane with respect to the direction perpendicular to the sensing direction of the shear force; however, rigidity at the first side will be higher than that of the second piezoelectric part with respect to the sensing direction of the shear force by the equivalent of the strength of the support beams, leading in some instances to nonuniform flexion of the membrane. In contrast, by forming the support beams along diagonal lines of the opening as taught in the present invention, flexion of the membrane can be brought into close approximation with a sine waveform, and shear force may be measured more accurately.

In the stress sensing device according to another aspect, the second piezoelectric part may include a second lower electrode layer formed on the support film, a second piezoelectric layer formed on top of the second lower electrode layer, and a second upper electrode layer formed on top of the second piezoelectric layer. The support beams may include a second lower electrode line connected to the second lower electrode layer, and a second upper electrode line connected to the second upper electrode layer.

According to this invention, the support beams include a second lower electrode line connected to the second lower electrode layer, and a second upper electrode line connected to the second upper electrode layer. Here, where there is only one pair of support beams axisymmetrical with respect to the line segment, one of this pair of support beams may serve as the second lower electrode line and the other as the second upper electrode line. Where four support beams are disposed extending from the second piezoelectric part along diagonal lines of the rectangular opening, for example, of the four support beams, one may serve as the second lower electrode line, another as the second upper electrode line, and the remaining two as dummy electrode lines that do not apply current; or two of the four support beams may serve as second lower electrode lines, and the other two as second upper electrode lines.

With this configuration, the electrode lines that carry the current output by the second piezoelectric part can be used as support beams, eliminating the need to provide separate support beams and providing a simpler configuration.

A tactile sensor according to another aspect of the present invention includes a plurality of the stress sensing devices as described above arranged in an array.

According to this invention, the tactile sensor includes a plurality of stress sensing devices disposed in an array arrangement, and the stress sensing devices are arranged in an array as taught above. Consequently, by disposing this tactile sensor on a sensor face for contacting objects, for example, it is possible to sense shear force and pressing force applied to the sensor face. In this regard, with a conventional tactile sensor in which the shear force sensors and the pressing force sensors are disposed in alternating fashion, for example, it is difficult to accurately sense pressing force action at a location where a shear force sensor is disposed, whereas with the present invention, it is possible to sense both shear force and pressing force using a single stress sensing device as described above, and therefore both shear force and pressing force acting on a single point may be sensed accurately.

Additionally, in the case of a sensor array layout in which shear force sensing devices and pressing force sensing devices are disposed in alternating fashion, for example, the shear force sensing regions and the pressing force sensing regions occupying a unit of surface area respectively have surface areas equivalent to approximately half the unit of surface area. In contrast to this, with the present invention, disposing the stress sensing devices in an array arrangement enables the entire area of the unit of surface area to be employed as a region for sensing both shear force and pressing force. Consequently, resolution of stress in each unit of area may be improved, and it is possible for shear force and pressing force to be sensed accurately.

The elastic layer in the tactile sensor according to another aspect may provided with regulating grooves between the stress sensing devices adjacent to one another, the regulating grooves regulating transmission of flexion through the elastic layer.

According to this invention, regulating grooves are formed in the elastic layer between stress sensing devices disposed neighboring one another. Here, the regulating grooves may be formed with a depth dimension equal to about three-fourths of the thickness dimension of the elastic layer, for example, leaving the elastic layer continuous between neighboring stress sensing devices; or formed to a depth such that the support film is reached, and neighboring stress sensing devices are disposed on independent segments of elastic layer.

According to this invention, through forming of regulating grooves it is possible to prevent shear force or pressing force acting on neighboring stress sensing devices from being transmitted via the elastic layer and sensed as a noise component, affording higher accuracy of sensing of shear force and pressing force by a single stress sensing device.

A grasping apparatus according to another aspect is a grasping apparatus for grasping an object, the grasping apparatus having the tactile sensor, including: at least one pair of grasp arms for grasping the object, the grasp arms having the tactile sensor disposed on a contact face that contacts the object; grasp sensing unit for sensing a state of slippage of the object based on the electrical signal output by the tactile sensor; and drive control unit for controlling driving of the grasp arms based on the slippage state.

According to this invention, by providing a tactile sensor as taught above, both shear force and pressing force may be sensed accurately when an object is grasped; and based on the sensed shear force and pressing force, it is possible to appropriately determine whether the object is slipping from the grasp arms, or grasped securely. Specifically, during an operation for grasping an object, shear force arises in response to kinetic friction under conditions in which the object cannot be grasped adequately, and as grasping force intensifies, this shear force increases as well. Meanwhile, a condition of intensifying grasping force until shear force in response to static friction is sensed represents a condition in which the object is grasped completely, and even if grasping force intensifies further, static friction is constant and therefore shear force does not change either. Consequently, by progressively increasing the force with which an object is grasped and by sensing the point in time that shear force no longer changes, it is possible for the object to be grasped with the minimum force necessary, without breaking the object.

BRIEF DESCRIPTION OF THE DRAWINGS

Referring now to the attached drawings which form a part of this original disclosure:

FIGS. 3A and 3B are illustrations depicting conditions of contact of an object against a shear force sensor element, wherein FIG. 3A is an illustration of the condition of the membrane prior to deformation, and FIG. 3B is an illustration of a condition of the membrane when deformed by stress (pressing force and shear force);

FIGS. 4A to 4C are illustrations depicting a model of potential difference arising between a shear force sensing piezoelectric film and a pressing force sensing piezoelectric film, wherein FIG. 4A depicts a condition with no deformation of the piezoelectric films, FIG. 4B depicts the piezoelectric films in an extended condition, and FIG. 4C depicts the piezoelectric films in a compressed condition;

FIG. 5 is an illustration depicting sensed patterns of current output by shear force sensing piezoelectric bodies and a pressing force sensing piezoelectric body when shear force is applied in the +X direction, when shear force is applied in the −X direction, and when pressing force is applied;

DETAILED DESCRIPTION OF EXEMPLARY EMBODIMENTS

First Embodiment

A first embodiment of a stress sensing device according to the present invention is described below based on the drawings.

1. Configuration of Stress Sensing Device

Figure 1:
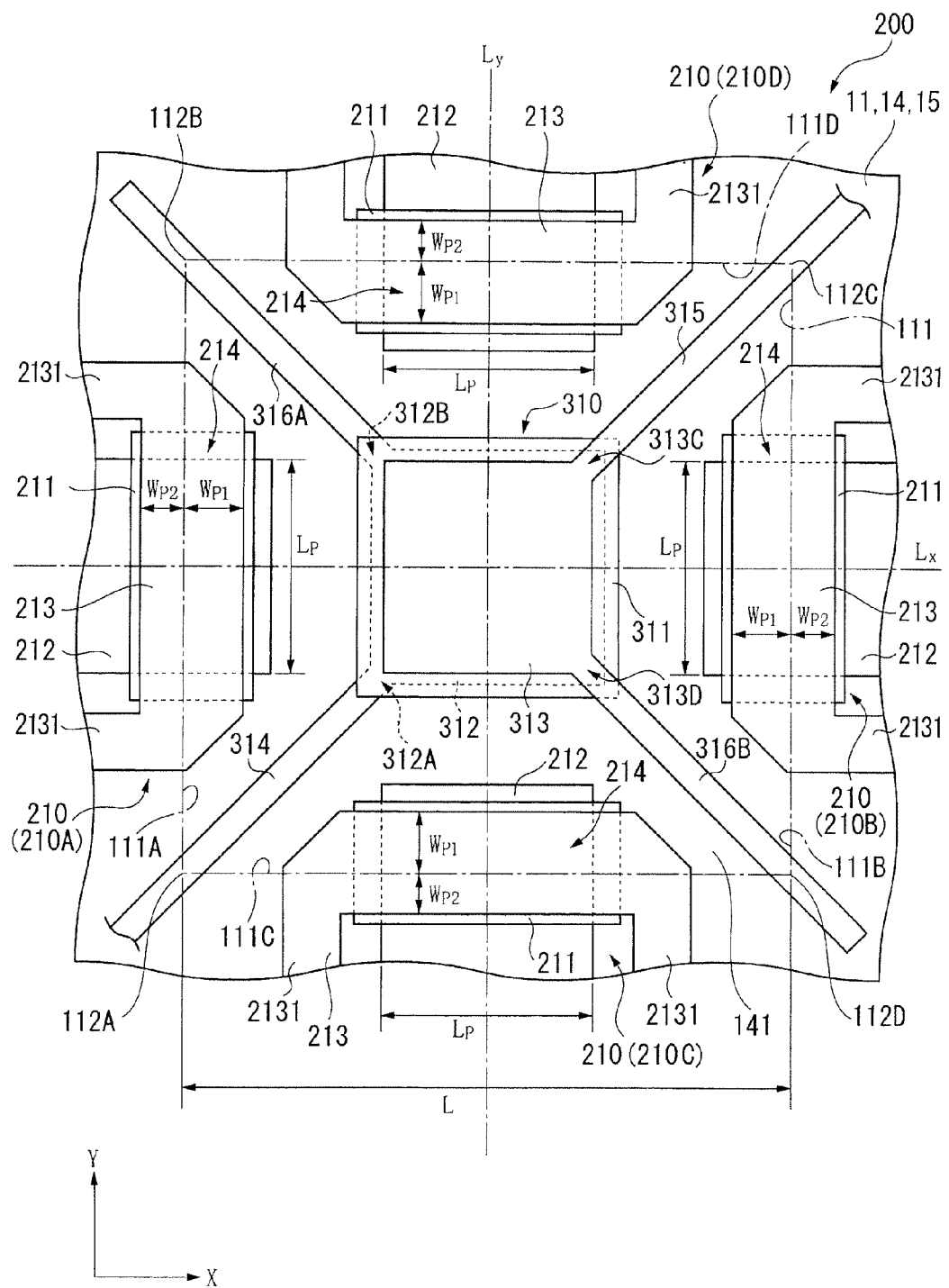
FIG. 1 is a plan view of a stress sensing device according to a first embodiment of the present invention.
Figure 2:
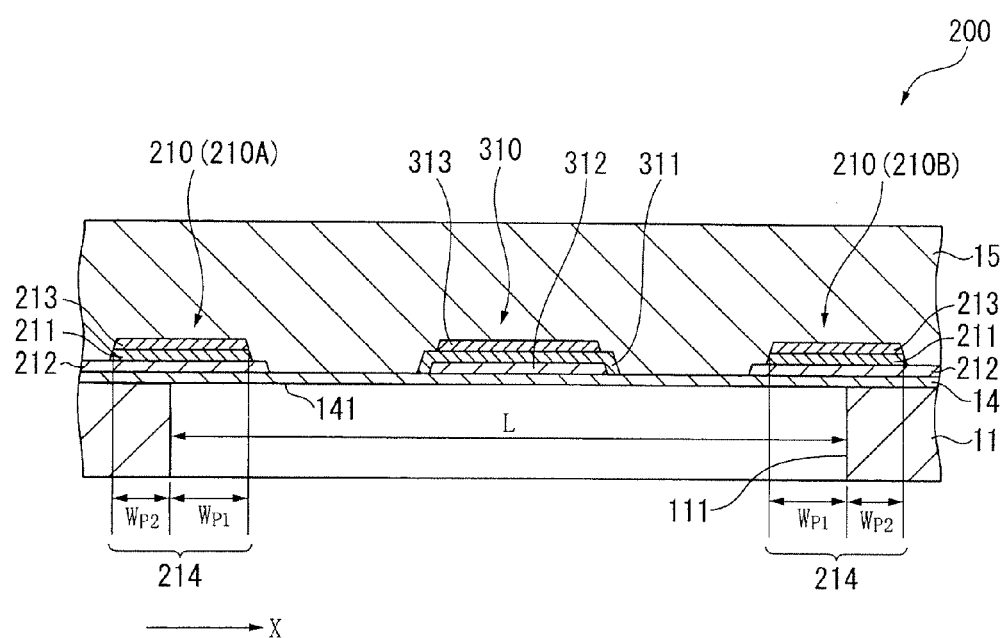
FIG. 2 is a sectional view of the stress sensing device of the first embodiment.

FIG. 1 is a plan view depicting a simplified configuration of a stress sensing device 200 according to the first embodiment; and FIG. 2 is a sectional view of the stress sensing device 200.

As shown in FIG. 1, the stress sensor element 200 is composed of a sensor substrate 11 provided as the support body, and laminated thereon are a support film 14, shear force sensing piezoelectric bodies 210 provided as first piezoelectric parts according to the present invention, a pressing force sensing piezoelectric body 310 provided as a second piezoelectric part according to the present invention, and an elastic layer 15 provided as the elastic layer. This stress sensor element 200 is an element for sensing pressing force and shear force applied during contact of an object against the elastic layer 15.

1-1. Configuration of Sensor Substrate

The sensor substrate 11 is made of Si, for example, and is formed with a thickness dimension of 200 μm, for example. As shown in FIGS. 1 and 2, an opening 111 is formed in this sensor substrate 11. This opening 111 is a square shape in plan view when the sensor substrate 11 is viewed from the sensor substrate 11 thickness direction (sensor plan view); sides 111A and 111B of the square constitute first straight parts according to the present invention, and sides 111C and 111B constitute second straight parts according to the present invention. In the present embodiment, this opening 111 is formed with a length dimension L of 500 μm per side.

1-2 Configuration of Support Film

While the support film 14 is not shown in the drawings, it is formed by a double layer structure composed of a $SiO_2$ layer grown on the sensor substrate 11 to a thickness dimension of 3 μm, for example, and a $ZrO_2$ layer deposited on this $SiO_2$ layer to a thickness dimension of 400 nm, for example. Here, the $ZrO_2$ layer is a layer provided in order to prevent delamination of the shear force sensing piezoelectric films 221 and the pressing force sensing piezoelectric film 311 during sintering of the shear force sensing piezoelectric bodies 210 and the pressing force sensing piezoelectric body 310 to be discussed later. Specifically, where the shear force sensing piezoelectric films 221 and the pressing force sensing piezoelectric film 311 are formed by PZT, for example, if the $ZrO_2$ layer is not present during sintering, Pb contained in the shear force sensing piezoelectric films 221 will diffuse into the $SiO_2$ layer, depressing the melting point of the $SiO_2$ layer and creating air bubbles on the surface of the $SiO_2$ layer, and these air bubbles cause delamination of the PZT. Moreover, if there is no $ZrO_2$ layer, problems such as diminished flexion efficiency in response to strain of the shear force sensing piezoelectric film 221 may arise. If on the other hand a $ZrO_2$ layer is formed over the $SiO_2$ layer, it is possible to avoid difficulties such as delamination or diminished flexion efficiency of the shear force sensing piezoelectric films 221.

In the discussion hereinbelow, the region of the support film 14 that, seen in sensor plan view as depicted in FIG. 1, closes the opening 111 is termed the membrane 141.

1-3 Configuration of Shear Force Sensing Piezoelectric Bodies

The shear force sensing piezoelectric bodies 210 are formed along each of the sides 111A to 111D of the opening 111 on the membrane 141, and are rectangular in shape with the lengthwise direction coincident with the linear direction of the sides 111A to 111D. Each of the shear force sensing piezoelectric bodies 210 is disposed straddling the inside and outside of the opening 111, to either side of each of the sides 111A to 111D in sensor plan view. These shear force sensing piezoelectric bodies 210 include a shear force sensing piezoelectric film 211 having a film profile, and a shear force sensing lower electrode 212 and a shear force sensing upper electrode 213 respectively formed in the film thickness direction of this shear force sensing piezoelectric film 211.

The shear force sensing piezoelectric film 211 is formed by growing a film of PZT (lead zirconate titanate) having a thickness dimension of 500 nm, for example. In the present embodiment, PZT is employed as the shear force sensing piezoelectric film 211, but any material may be used provided that the material is one with the ability to generate electric charge in response to stress changes in the film, such as lead titanate ($PbTiO_3$), lead zirconate ($PbZrO_3$), lead lanthanum titanate (($Pb, La)TiO_3$), aluminum nitrate (AlN), zinc oxide (ZnO), polyvinylidene fluoride (PVDF) and the like, for example. When the support film experiences flexion due to shear force, the shear force sensing piezoelectric film 211 gives rise to a potential difference between the shear force sensing lower electrode 212 and the shear force sensing upper electrode 213, depending on the degree of flexion. Electrical current thereby flows from the shear force sensing piezoelectric film 211 to the shear force sensing lower electrode 212 and the shear force sensing upper electrode 213, and an electrical signal is output.

The shear force sensing lower electrode 212 and the shear force sensing upper electrode 213 are electrodes formed sandwiching the shear force sensing piezoelectric film 211 in the film thickness direction. The shear force sensing lower electrode 212 is formed on the face that faces towards the membrane 141 of the shear force sensing piezoelectric film 211, and the shear force sensing upper electrode 213 is formed on the face that faces towards the opposite side from the face where the shear force sensing lower electrode 212 is formed.

Each of the shear force sensing lower electrodes 212 is an electrode with a film profile having a thickness dimension of 200 nm, for example, formed straddling the inside and outside of the membrane 141 along a direction perpendicular to the sides 111A to 111D where the shear force sensing piezoelectric bodies 210 are formed. The shear force sensing lower electrodes 212 may be any electrically conductive thin film having conductivity; in the present embodiment, a Ti/Ir/Pt/Ti lamellar structure film is used, for example.

The shear force sensing upper electrode 213 is an electrode with a film profile having a thickness dimension of 50 nm, for example. This shear force sensing upper electrode 213 is formed parallel to the side 111A-111D where the shear force sensing piezoelectric body 210 is formed, and covers an area between the lengthwise edges of the shear force sensing piezoelectric film 211 (the piezoelectric film edges 2111). Lead portions 2131 are formed at the lengthwise ends of the shear force sensing upper electrode 213. Due to this electrode pattern, there are no portions of direct contact between the shear force sensing lower electrode 212 and the shear force sensing upper electrode 213, the electrodes are not covered by an insulating film or the like, and an electrical signal can be readily obtained from the shear force sensing piezoelectric body 210.

For this shear force sensing upper electrode 213 as well, any material that is an electrically conductive thin film comparable that of the shear force sensing lower electrode 212 may be used; in the present embodiment, an Ir thin film is used.

In such a shear force sensing piezoelectric body 210, viewed along the film direction, overlapped sections of the shear force sensing lower electrode 212, the shear force sensing piezoelectric film 211, and the shear force sensing upper electrode 213 constitute a piezoelectric laminate portion 214 for detecting the degree of flexion of the support film.

Here, the piezoelectric laminate portion 214 is formed extended across the inside and outside of the membrane 141; in preferred practice the dimension $W_{p1}$ of the piezoelectric laminate portion 214 along a sensing direction of the shear force inside the membrane 141 (for example, the X direction for the shear force sensing piezoelectric body 210A or 210B, or the Y direction for the shear force sensing piezoelectric body 210C or 210D) is ⅓ or less the dimension $L_p$ along the lengthwise direction of the piezoelectric laminate portion 214 (for example, the Y direction for the shear force sensing piezoelectric body 210A or 210B, or the X direction for the shear force sensing piezoelectric body 210C or 210D). For example, in the present embodiment, $W_{p1}$=30 μm, and $L_p$=260 μm. The reason for doing so is that if the dimension $W_{p1}$ of the piezoelectric laminate portion 214 along a sensing direction of the shear force inside the membrane 141 is greater than ⅓ the dimension $L_p$ along the lengthwise direction of the piezoelectric laminate portion 214, there is a high probability of the piezoelectric laminate portion 214 being affected by shear force along the lengthwise direction of the piezoelectric laminate portion 214. In contrast to this, where the dimensions of the piezoelectric laminate portion 214 are formed such that $3W_{p1} \leq L_p$ as taught above, the effects of shear force along the lengthwise direction of the piezoelectric laminate portion 214 are eliminated, and it is possible to accurately detect shear force in the sensing direction of the shear force exclusively.

Additionally, in preferred practice, to the outside of the membrane 141, the piezoelectric laminate portion 214 is formed such that the dimension $W_{p2}$ thereof along a shear force sensing direction is 5 times or greater the sum of the film thickness dimensions of the support film 14 and the piezoelectric laminate portion 214. In the present embodiment, total film thickness of the support film 14 and the piezoelectric laminate portion 214 is approximately 4.15 μm, and the dimension $W_{p2}$ is 25 μm, for example.

Here, if the dimension $W_{p2}$ of the piezoelectric laminate portion 214 along the X direction to the outside of the membrane 141 is a dimension equal to less than five times sum of the film thickness dimensions of the support film 14 and the piezoelectric laminate portion 214, a problem like the following may occur. Specifically, moment force tending to thrust the layers into the opening through shear force and moment tending to uplift the layers in a direction away from the opening 111 are produced during deformation of the membrane 141 caused by shear force. These moment forces act respectively on the support film 14, the shear force sensing lower electrode 212, the shear force sensing piezoelectric film 211, and the shear force sensing upper electrode 213, and induce deformation of the membrane 141 and the shear force sensing piezoelectric body 210. At this time, in the region of the piezoelectric laminate portion 214 to the outside of the membrane 141 in the shear force sensing piezoelectric body 210, stress relating to deformation of the membrane 141 decreases moving further away from the edge of the opening 111 (the side 111A-111D). Here, if the X direction dimension $W_{p2}$ of the section of the piezoelectric laminate portion 214 formed to the outside of the membrane 141 is such that $W_{p2} < 5t$ (where t is total thickness), an adequate level of stress relating to deformation of the membrane 141 cannot be received, and therefore stable deformation of the membrane 141 is not achieved. There is also a risk of delamination of the films 311, 312, 313 that make up the shear force sensing piezoelectric body 210. If on the other hand the shear force sensing piezoelectric body 210 is formed with a dimension $W_{p2}$ such that $W_{p2} \geq 5t$, deformation of the membrane 141 may take place in a stable manner, and difficulties such as delamination may be avoided.

The elastic layer 15 is a film that covers the support film 14 and the shear force sensing piezoelectric body 210 as described above. In the present embodiment, PDMS (polydimethyl siloxane), for example is used as the elastic layer 15, but no limitation thereto is imposed, and a film formed of some other elastic material, such as a synthetic resin having elasticity, may be used as well. No particular limitation is imposed as to the thickness dimension of the elastic layer 15, but it may be formed to 300 μm, for example.

The elastic layer 15 functions as a protective film for the shear force sensing piezoelectric body 210, and shear force applied to the elastic layer 15 is transmitted to the membrane 141 and induces flexion thereof. Through flexion of the membrane 141 caused by flexion of this elastic layer 15, the shear force sensing piezoelectric body 210 experiences flexion as well, and an electrical signal proportional to the degree of flexion is output.

1-4. Configuration of Pressing Force Sensing Piezoelectric Body

The pressing force sensing piezoelectric body 310 is formed on the membrane 141 at the center of the opening 111. This pressing force sensing piezoelectric body 310 includes a pressing force sensing piezoelectric film 311 provided as a second piezoelectric body layer according to the present invention; a pressing force sensing lower electrode 312 provided as a second lower electrode layer according to the present invention, disposed between the pressing force sensing piezoelectric film 311 and the support film 14; and a pressing force sensing upper electrode 313 provided as a second upper electrode layer according to the present invention, disposed between the pressing force sensing piezoelectric film 311 and the elastic layer 15.

The pressing force sensing piezoelectric film 311, the pressing force sensing lower electrode 312, and the pressing force sensing upper electrode 313 are respectively formed with square shape, and are laminated in order of the pressing force sensing lower electrode 312, pressing force sensing piezoelectric film 311, and the pressing force sensing upper electrode 313. While the present embodiment shows an example of forming the pressing force sensing piezoelectric body 310 with a square shape corresponding to the square shaped opening 111, in consideration of the balance of rigidity so as to avoid unstable flexion of the membrane 141, other configurations in which the pressing force sensing piezoelectric body 310 is formed with circular shape, for example would be acceptable also.

The pressing force sensing piezoelectric film 311, the pressing force sensing lower electrode 312, and the pressing force sensing upper electrode 313 are formed of materials comparable to and thickness dimensions identical to those of the shear force sensing piezoelectric film 211, the shear force sensing lower electrode 212, and the shear force sensing upper electrode 213 of the stress sensing device 200 discussed earlier. That is, during manufacture of the stress sensing device 200, the shear force sensing piezoelectric body 210 and the pressing force sensing piezoelectric body 310 are formed simultaneously through sputtering, or formed simultaneously through patterning by a photolithography technique, for example.

As shown in FIG. 1, in the pressing force sensing lower electrode 312, a pressing force sensing lower electrode line 314 provided as a second lower electrode line according to the present invention is formed extending from the −X−Y direction apex 312A towards the −X−Y direction apex 112A of the membrane 141, and functions as a support beam according to the present invention. A dummy electrode line 316A functioning as a support beam according to the present invention is formed extending from the +X+Y direction apex 312B of the pressing force sensing lower electrode 312 towards the +X+Y direction apex 112B of the membrane 141. Additionally, in the pressing force sensing upper electrode 313, a pressing force sensing upper electrode line 315 provided as a second upper electrode line according to the present invention is formed extending from the +X+Y direction apex 313C towards the +X+Y direction apex 112C of the membrane 141, and functions as a support beam according to the present invention. A dummy electrode line 316B functioning as a support beam according to the present invention is formed extending from the +X+Y direction apex 313D of the pressing force sensing upper electrode 313 towards the +X+Y direction apex 112D of the membrane 141.

Specifically, the pressing force sensing lower electrode line 314, the pressing force sensing upper electrode line 315, and the two dummy electrode lines 316A, 316B are formed along diagonal lines of the square shaped opening 111. By patterning the electrode lines 314, 315, 316A, 316B in this way, the rigidity balance of the membrane 141 is stabilized, and difficulties such as greater flexion at the +X side than at the −X side when subjected to pressing force may be avoided.

The pressing force sensing lower electrode line 314 and the pressing force sensing upper electrode line 315 are respectively connected to a control device for processing signals from the stress sensing device 200, for example, via a conductive member such as a flexible substrate, not shown, that is connected to the side edge of the support film 14.

2. Operation of Stress Sensing Device

Next, operation of the stress sensing device 200 discussed previously will be described based on the drawings.

In the stress sensing device 200, when shear force is applied along the X direction, this shear force is sensed by the shear force sensing piezoelectric bodies 210A, 201B; and when shear force is applied along the Y direction, this shear force is sensed by the shear force sensing piezoelectric bodies 210C, 201D. When pressing force is applied on the perpendicular to the sensor substrate 11, this pressing force is sensed by the pressing force sensing piezoelectric body 310.

Here, by way of an example, the direction of sensing of shear force by the shear force sensing piezoelectric bodies 210A, 201B is described in the case of pressing force applied on the perpendicular to the planar direction of the membrane 141, and shear force applied towards the X direction. If shear force is applied in the Y direction, the shear force is sensed by a comparable operation, so description thereof is omitted.

FIGS. 3A and 3B are an illustration depicting conditions of contact of a grasped object Z against a shear force sensor element, wherein FIG. 3A is an illustration of the condition of the membrane 141 prior to deformation, and FIG. 3B is an illustration of a condition of the membrane 141 when deformed by stress (pressing force and shear force).

As shown in FIG. 3A, in the stress sensing device 200, when the object Z contacts the elastic layer 15 and applies shear force in the direction of the arrow P1, the membrane 141 experiences flexion as depicted in FIG. 3B.

Specifically, when shear force arises in the elastic layer 15, moment force thrusting into the opening 111 as shown by the arrow M1 is produced at the face on the −X side of the membrane 141, whereas moment force uplifting from the opening 111 as shown by the arrow M2 is produced at the face on the +X side. Also, when the object Z contacts the elastic layer 15 and applies pressing force in the direction shown by the arrow P2, force like that indicated by the arrow F1 in FIG. 3B is applied, and therefore the membrane 141 experiences flexion inducing depression into the opening 11 as depicted in FIG. 3B.

While not shown in the drawing, if the membrane 141 is subjected to the action of shear force only, with no application of pressing force, it experiences flexion to a shape resembling a sine wave equivalent to one wavelength; whereas if subjected to the action of pressing force only, with no application of shear force, the membrane 141 experiences flexion to an arcuate shape which overall is convex towards the opening 111.

Figure 4A:
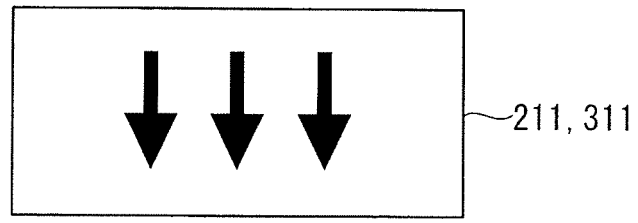
Figure 4B:
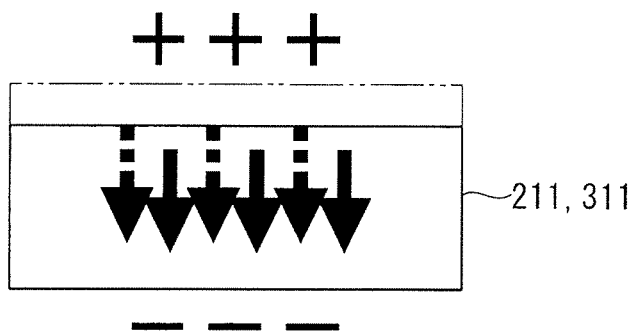
Figure 4C:
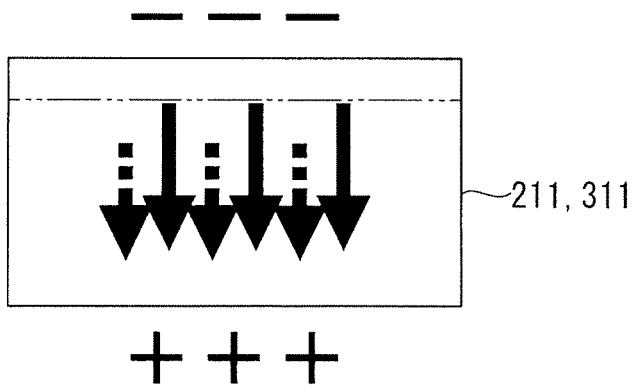

FIGS. 4A to 4C are illustrations depicting a model of potential difference arising between the shear force sensing piezoelectric film 211 and the pressing force sensing piezoelectric film 311, wherein FIG. 4A depicts a condition with no deformation of the piezoelectric films 211, 311, FIG. 4B depicts the piezoelectric films 211, 311 in an extended condition, and FIG. 4C depicts the piezoelectric films 211, 311 in a compressed condition. FIG. 5 is an illustration depicting sensed patterns of current output by the shear force sensing piezoelectric bodies 201A, 210B and the pressing force sensing piezoelectric body 310 when shear force is applied in the +X direction, when shear force is applied in the −X direction, and when pressing force is applied.

In order to sense pressing force and shear force with the stress sensing device 200 in the manner described previously, voltage is preliminarily applied across the shear force sensing upper electrode 213 and the shear force sensing lower electrode 212, and across the pressing force sensing upper electrode 313 and the pressing force sensing lower electrode 312, applying voltage as depicted in FIG. 4A to creating polarization. In this state, if the membrane 141 experiences flexion, a potential difference arises between the shear force sensing piezoelectric film 211 and the pressing force sensing piezoelectric film 311.

Here, in the event that only shear force directed towards the +X direction is applied to the elastic layer 15, the shear force sensing piezoelectric film 211 of the shear force sensing piezoelectric body 210A experiences tensile stress in the in-plane direction of the shear force sensing piezoelectric film 211 as shown in FIG. 4B, and film thickness decreases. Because of this, in the shear force sensing piezoelectric film 211 polarization moment declines, positive charge sufficient to cancel out the difference from initial polarization value is produced at the contact face with the shear force sensing upper electrode 213, and negative charge is produced at the contact face with the shear force sensing lower electrode 212.

Therefore, current flows in the direction from the shear force sensing lower electrode 212 towards the shear force sensing upper electrode 213, and is output as an electrical signal.

Meanwhile, in the shear force sensing piezoelectric film 211 of the shear force sensing piezoelectric body 210 on the +X direction side, moment force gives rises to compressive stress in the shear force sensing piezoelectric film 211 as depicted in FIG. 4C, and film thickness increases. Because of this, in the shear force sensing piezoelectric film 211 polarization moment increases, negative charge is produced in the shear force sensing upper electrode 213, and positive charge is in the shear force sensing lower electrode 212. Therefore, current flows in the direction from the shear force sensing upper electrode 213 towards the shear force sensing lower electrode 212, and is output as an electrical signal.

In the event that only shear force is applied and no pressing force is applied, no current is sensed from the pressing force sensing piezoelectric body 310. Consequently, in this event, signal values of a sensed current pattern like that indicated in (i) in FIG. 5 are obtained. In the event that shear force is applied along the −X direction, the membrane experiences flexion in the opposite direction, and signal values of a sensed current pattern like that indicated in (ii) in FIG. 5 are obtained.

On the other hand, in the event that only pressing force is applied and no shear force is applied, the pressing force sensing piezoelectric body 310 bends into a convex profile in a direction of thrust into the opening 111. In this instance, the pressing force sensing piezoelectric film 311 experiences compressive deformation as depicted in FIG. 4C, and current flows in the direction from the pressing force sensing upper electrode 313 towards the pressing force sensing lower electrode 312. Consequently, signal values of a sensed current pattern like that indicated in (iii) in FIG. 5 are obtained.

When both shear force and pressing force are applied to the stress sensing device 200 and the membrane 141 experiences flexion as depicted in FIG. 3B, the shear force and the pressing force are calculated from the signal values output by the shear force sensing piezoelectric bodies 210A, 210B, 210C, 210D, and by the pressing force sensing piezoelectric body 310.

Here, using the signal value A output from the shear force sensing piezoelectric body 210A, the signal value B output from the shear force sensing piezoelectric body 210B, the signal value C output from the shear force sensing piezoelectric body 210C, the signal value D output from the shear force sensing piezoelectric body 210D, and the signal value E output from the pressing force sensing piezoelectric body 310, it is possible to calculate shear force along the X direction $S_x$, shear force along the Y direction $S_y$, and pressing force O, using the equations below. In the Equation (1) to Equation (3) below, $k_1$ and $k_2$ are respectively constants. In Equations (1) and (2), sign(M−N) signifies a computational formula that returns a "−1" if the value of (M−N) is negative, returns a "+1" if positive, and returns a "0" if 0. ABS(M−N) signifies the absolute value of (M−N).

Equations (1)-(3)

$$S_x = \mathrm{sign}(A-B) \times (abs(A-B) - k_1 \times E) \quad (1)$$

$$S_y = \mathrm{sign}(C-D) \times (abs(C-D) - k_1 \times E) \quad (2)$$

$$O = C - k_2 \times \left(\frac{A+B+C+D}{4}\right) \quad (3)$$

3. Output Circuits of Stress Sensing Device

The stress sensing device 200 described above includes an output circuit for performing addition of the signal value A output from the shear force sensing piezoelectric body 210A on the −X direction side and the signal value B output from the shear force sensing piezoelectric body 210B on the +X direction side, and outputting the result; and an output circuit for performing addition of the signal value C output from the shear force sensing piezoelectric body 210C on the −Y direction side and the signal value D output from the shear force sensing piezoelectric body 210D on the +Y direction side, and outputting the result.

In alternative configurations, these output circuits may, for example be formed on the sensor substrate 11, or provided as separate elements from the sensor substrate 11 and connected to the shear force sensing lower electrode 212 and the shear force sensing upper electrode 213 formed on the sensor substrate 11. Where furnished separately from the sensor substrate 11, a configuration in which the circuits are housed within the device to which the stress sensing device 200 is attached may be employed, for example.

Figure 6A:
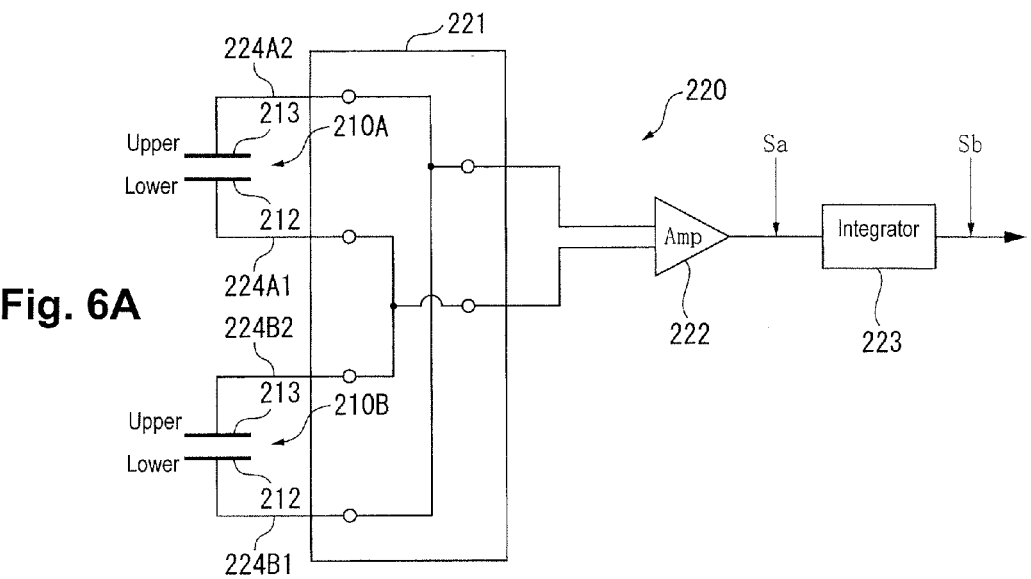
FIGS. 6A and 6B are circuit diagrams depicting a simplified configuration of an output circuit for outputting signal values from the shear force sensing piezoelectric bodies of a stress sensing device.
Figure 6B:
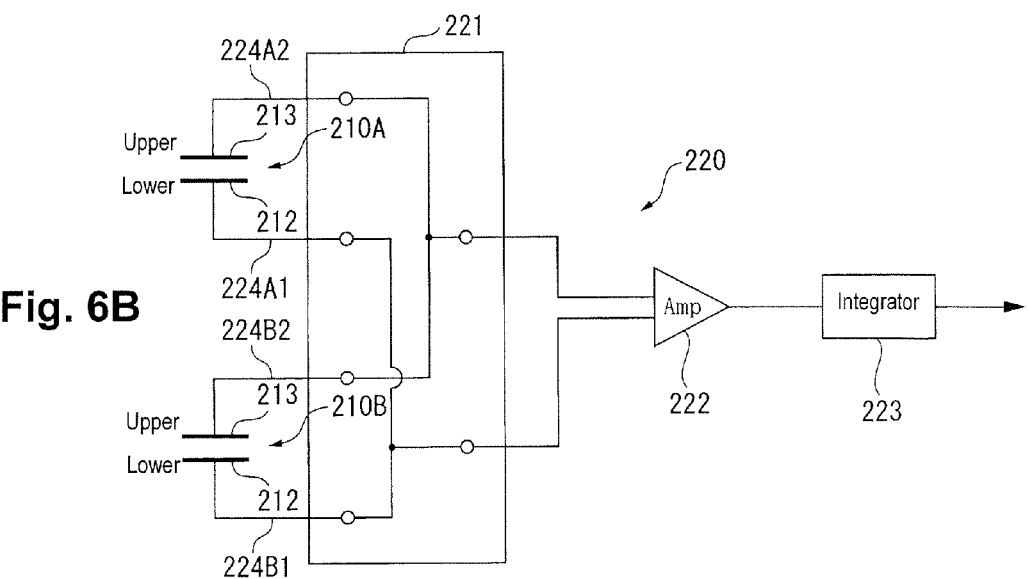

FIGS. 6A and 6B are circuit diagrams depicting a simplified configuration of an output circuit 220 for performing addition of and outputting signal values output by the shear force sensing piezoelectric bodies 210A, 210B of the stress sensing device 220. The output circuit for performing addition of and outputting signal values output by the shear force sensing piezoelectric bodies 210C, 210D has the same configuration as the output circuit 220, and will not be described here.

In the output circuit 220 of the stress sensing device 200 of the present embodiment, a connecting line 224A1 connects to the shear force sensing lower electrode 212 of the shear force sensing piezoelectric body 210A; a connecting line 224A2 connects to the shear force sensing upper electrode 213 of the shear force sensing piezoelectric body 210A; a connecting line 224B1 connects to the shear force sensing lower electrode 212 of the shear force sensing piezoelectric body 210B; and a connecting line 224B2 connects to the shear force sensing upper electrode 213 of the shear force sensing piezoelectric body 210B. This output circuit 220 is also provided with a switching circuit 221 for switching the connection states of the connecting lines 224A1, 224A2, 224B1, 224B2; an amplifier (amp) 222; and an integrator 223. By switching this switching circuit 221, this output circuit 220 functions as either an addition circuit or a subtraction circuit.

Specifically, in an instance of sensing shear force, as depicted in FIG. 6A, the switching circuit 221 connects the connecting line 224A1 with the connecting line 224B2, and the line 224A2 with the connecting line 224B1, respectively, and performs subtraction of the signal value A and the signal value B as indicated by Equation (2) or Equation (3) above.

When shear force acts in the manner shown in FIG. 3B, because the shear force sensing piezoelectric body 210A and the shear force sensing piezoelectric body 210B have opposite flexion directions, this has the effect that the current output by the shear force sensing piezoelectric body 210A and by the shear force sensing piezoelectric body 210B have opposite polarities. Consequently, in order to output the difference of the signal value A and the signal value B, the shear force sensing upper electrode 213 of the shear force sensing piezoelectric body 210A is connected to the shear force sensing lower electrode 212 of the shear force sensing piezoelectric body 210B, and the shear force sensing lower electrode 212 of the shear force sensing piezoelectric body 210A is connected to the shear force sensing upper electrode 213 of the shear force sensing piezoelectric body 210B, in order to align the polarities of the currents output by the shear force sensing piezoelectric bodies 210A, 210B; the resultant signal is then output to the amplifier (amp) 222.

Figure 7:
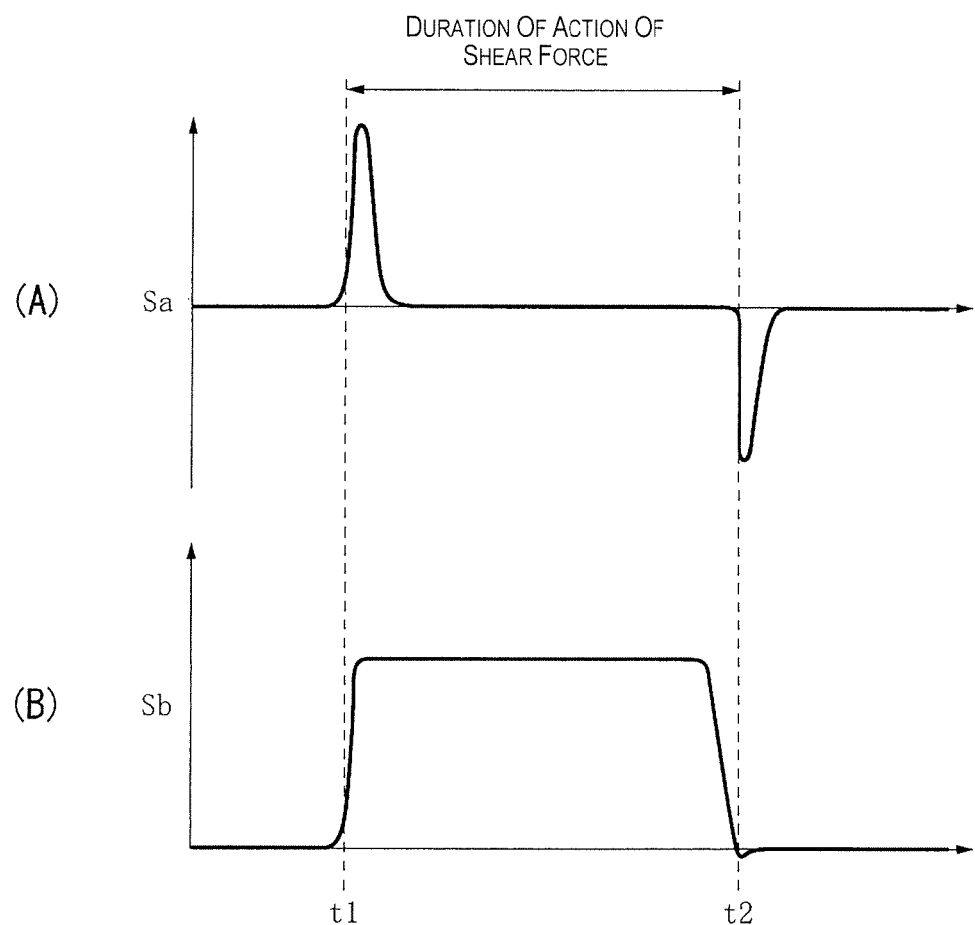
FIG. 7 is an illustration depicting examples of transmission waveforms of a shear output signal output from the output signal of FIG. 6A, wherein (A) is an illustration of a transmission waveform at point Sa in FIG. 6A, and (B) is an illustration of a transmission waveform at point Sb in FIG. 6A.

The current that is output from these shear force sensing piezoelectric bodies 210A, 210B is amplified by the amplifier 222, and is then input to the integrator 223 to obtain transmission waveforms like those depicted in FIG. 7.

FIG. 7 (A) is an illustration of a transmission waveform at point Sa in FIG. 6, and (B) is an illustration of a transmission waveform at point Sb in FIG. 6.

At timing t1 when the object Z comes into contact with the elastic layer 15 and shear force is produced in the X direction, the stress sensing device 200 outputs a positive electrical signal as shown in FIG. 7 (A), for example. Then, when, for example at timing t2 the object Z is released from the elastic layer 15 and shear force disappears, the elastic layer 15 returns to the original location through elasticity, and therefore the membrane 141 returns to the original position as well. Due to deformation of the shear force sensing piezoelectric body 210 occurring at this time, a negative electrical signal is output. By inputting this electrical signal to the integrator 223, a shear force output signal (A−B) like that shown in FIG. 7 (B) is obtained. With this shear force output signal, a signal in response shear force is output continuously for the duration of action of the shear force.

For actual shear forces, calculation of signal values is carried out by an arithmetic circuit, not shown, based on Equation (1) using the shear force output signal (A−B) obtained based on the shear force sensing piezoelectric bodies 210A, 210B, and the signal value E obtained from the pressing force sensing piezoelectric body 310; and the result is output as the shear force sensor signal $S_x$.

On the other hand, in the event that pressing force is sensed, as depicted in FIG. 6B, the switching circuit 221 connects the connecting line 224A1 with the connecting line 224B1, and the line 224A2 with the connecting line 224B2, respectively. The signal output by the switching circuit 221 is then output to the amplifier 222 and the integrator 223, to obtain a signal value (A+B) representing addition of the signal values A, B output by the shear force sensing piezoelectric body 210A and the shear force sensing piezoelectric body 210B.

At this time, the output circuit connected to the shear force sensing piezoelectric body 210C and the shear force sensing piezoelectric body 210D likewise obtains a signal value (C+D) representing addition of the signal value from the shear force sensing piezoelectric body 210C and the signal value D from shear force sensing piezoelectric body 210D.

The above signal values (A+B) and (C+D), together with the signal value E obtained from the pressing force sensing piezoelectric body 310, are output to an arithmetic circuit, not shown, calculations are carried out based on Equation (3), and a pressing force sensor signal is output.

4. Working Effect of the First Embodiment

As described above, the stress sensing device 200 of the preceding first embodiment includes the support film 14 disposed on the sensor substrate 11 in which the opening 111 has been formed; and on this support film 14 the shear force sensing piezoelectric bodies 210 are disposed straddling the inside and outside of the membrane 141 along the sides 111A to 111D of the opening 111. To the inside of the membrane 141, the pressing force sensing piezoelectric body 310 is formed separate from the shear force sensing piezoelectric bodies 210. The elastic layer 15 is laminated over the top of the support film 14 and the piezoelectric bodies 210, 310. In the stress sensing device 200 having the above configuration, the membrane 141 experiences flexion due to application of shear force and pressing force to the elastic layer 15, and an electrical signal in response to the shear force is output by the shear force sensing piezoelectric bodies 210, while an electrical signal in response to the pressing force is output by the pressing force sensing piezoelectric body 310. Consequently, by sensing these electrical signals, both shear force and pressing force acting on a single membrane 141 can be sensed accurately. Also, as compared with the case where two elements, namely a sensor element for sensing shear force and a sensor element for sensing pressing force, are provided in order to sense shear force and pressing force, according to the stress sensing device 200 described above both shear force and pressing force can be sensed with a single element, and sensor size may be made more compact.

Moreover, in the stress sensing device 200 described above, the opening 111 has a pair of sides 111A, 111B parallel in the Y direction and a pair of sides 111C, 111D parallel in the X direction, and the shear force sensing piezoelectric bodies 210A, 210B, 210C, 210D are respectively disposed along these sides 111A, 111B, 111C, 111D.

According to the stress sensing device 200 having this configuration, shear force in the X direction can be sensed by the shear force sensing piezoelectric bodies 210A, 210B, and shear force in the Y direction can be sensed by the shear force sensing piezoelectric bodies 210C, 210D. Specifically, shear forces acting in the X direction and the Y direction respectively can be sensed by the single stress sensing device 200. By sensing these shear forces, shear force acting in any direction within the plane of the membrane 141 can be sensed.

Further, the shear force sensing piezoelectric bodies 210A, 210B for detecting shear force in the X direction are formed at each of the mutually facing pair of sides 111A, 111B; and the shear force sensing piezoelectric bodies 210C, 210D for detecting shear force in the Y direction are formed at each of the mutually facing pair of sides 111C, 111D.

For this reason, flexion of the membrane 141 in the X direction can be sensed by the two shear force sensing piezoelectric bodies 210A, 210B, and flexion in the Y direction can be sensed by the two shear force sensing piezoelectric bodies 210C, 210D. Consequently, by adding the absolute values of these signal values, greater signal values can be obtained, and correct shear force can be detected with higher accuracy.

Moreover, the pressing force sensing piezoelectric body 310 is disposed at the center of the membrane 141, and from this pressing force sensing piezoelectric body 310, by way of support beams extending along diagonal lines of the opening 111, there are respectively formed the pressing force sensing lower electrode line 314, the pressing force sensing upper electrode line 315, and the dummy electrode lines 316A, 316B.

Specifically, the pressing force sensing lower electrode line 314 and the dummy electrode line 316A are disposed at axisymmetrical locations with respect to an X line segment Lx (see FIG. 1) which lies parallel to the X direction and passes through the center of the membrane 141; and the pressing force sensing upper electrode line 315 and the dummy electrode line 316B are likewise disposed at axisymmetrical locations with respect to the X line segment which passes through the center of the membrane 141. The pressing force sensing lower electrode line 314 and the dummy electrode line 316B are disposed at axisymmetrical locations with respect to the Y line segment Ly (see FIG. 1) which lies parallel to the Y direction and passes through the center of the membrane 141; and the pressing force sensing upper electrode line 315 and the dummy electrode line 316A are likewise disposed at axisymmetrical locations with respect to the Y line segment which passes through the center of the membrane 141. Stable flexion of the membrane 141 may be attained through the electrode lines 314, 315, 316A, 316B being so disposed.

That is to say, while it is necessary to connect the electrode lines 314, 315 in order to acquire signals from the pressing force sensing piezoelectric body, if these electrode lines 314, 315 are not disposed at axisymmetrical locations with respect to the X line segment, e.g. if the electrode lines 314, 315 are formed towards the apices 112A, 112D situated at the −Y side of the opening 111, rigidity will differ between the −Y direction side of the membrane 141 where the electrode lines 314, 315 and the +Y direction side where the electrode lines 314, 315 are absent. Thus, the region at the −Y direction side of the membrane 141 will resist flexion, while the region at the +Y direction side will readily undergo flexion, making it impossible to achieve stable flexion.

In such a case, when sensing shear force in the X direction, for example, the region at the +Y side of the shear force sensing piezoelectric body 210A and the shear force sensing piezoelectric body 210B may experience greater flexion than the region at the −Y direction side, and the shear force sensing accuracy may be lower.

In this regard, by forming the pressing force sensing lower electrode line 314 and the pressing force sensing upper electrode line 315 towards the apices 112A, 112B situated at the −X direction side of the opening 111, rigidity may be made uniform with respect to the Y direction of the membrane 141, and in the case of sensing of shear force in the X direction, sensing accuracy may be improved. However, in this instance, the region at the −X direction side of the membrane 141 will resist flexion, while the region at the +X direction side will readily undergo flexion, and therefore sensing accuracy of shear force in the Y direction will be lower.

In contrast to this, by providing the dummy electrode lines 316A, 316B, and forming the electrode lines 314, 315, 316A, 316B so as to be axisymmetrical with respect to the X line segment Lx and the Y line segment Ly, and specifically along diagonal lines of the opening 111, as taught in the preceding embodiment, flexion of the membrane 141 can be stabilized with respect to both the X direction and the Y direction, and the sensing accuracy of shear force and sensing accuracy of pressing force in the X direction and the Y direction can be improved.

Additionally, the output circuit 220 of the shear force sensing piezoelectric body 210A and the shear force sensing piezoelectric body 210B of the stress sensing device 200 includes the switching circuit 221 which is adapted to switch the connection states of the connection lines 224A1, 224B1 connecting to the shear force sensing lower electrode 212, and of the connection lines 224A2, 224B2 connecting to the shear force sensing upper electrode 213. During sensing of shear force, the connection states produced by the switching circuit 221 are such that, as shown in FIG. 6A, the connection line 224A1 and the connection line 224B2 are connected, the connection line 224A2 and the connection line 224B1 are connected, and the difference of the signal value A output by the shear force sensing piezoelectric body 210A and the signal value B output by the shear force sensing piezoelectric body 210B is output by the output circuit 220. Because of this, when sensing shear force in the X direction, a greater signal value can be obtained, and more accurate shear force can be measured based on Equation (1) (or Equation (2) in the case of shear force in the Y direction).

During sensing of pressing force, the connection states produced by the switching circuit 221 are such that, as shown in FIG. 6B, the connection line 224A1 and the connection line 224B1 are connected, the connection line 224A2 and the connection line 224B2 are connected, and the sum of the signal value A output by the shear force sensing piezoelectric body 210A and the signal value B output by the shear force sensing piezoelectric body 210B is output by the output circuit 220. Because of this, more accurate pressing force can be readily measured based on Equation (3).

Second Embodiment

Next, as an application example of the stress sensing device 200 described above, a tactile sensor furnished with the stress sensing device 200 is described based on the drawings.

Figure 8:
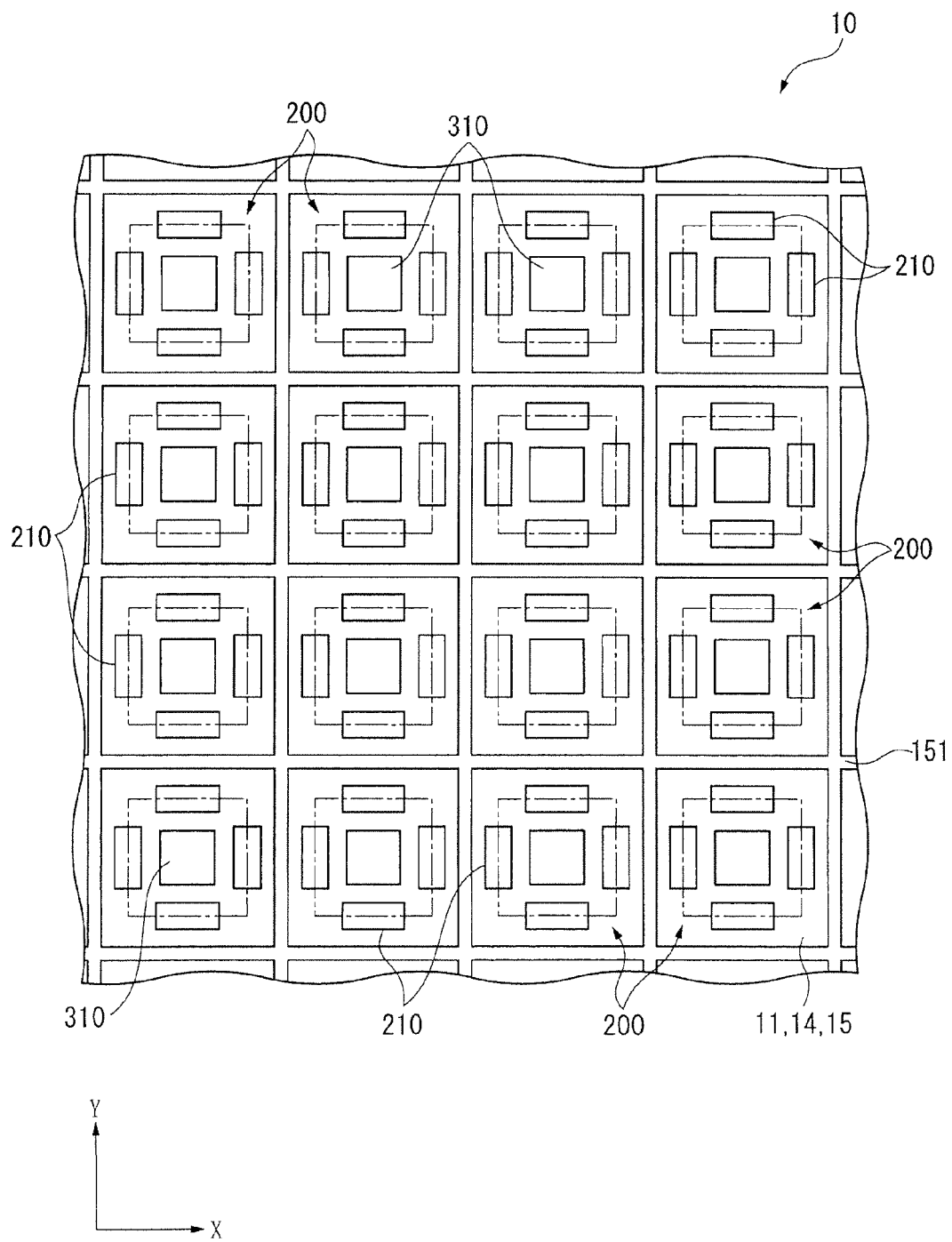
FIG. 8 is a fragmentary enlarged plan view of a tactile sensor of a second embodiment.

FIG. 8 is a fragmentary enlarged plan view of the tactile sensor of the second embodiment.

Figure 9:
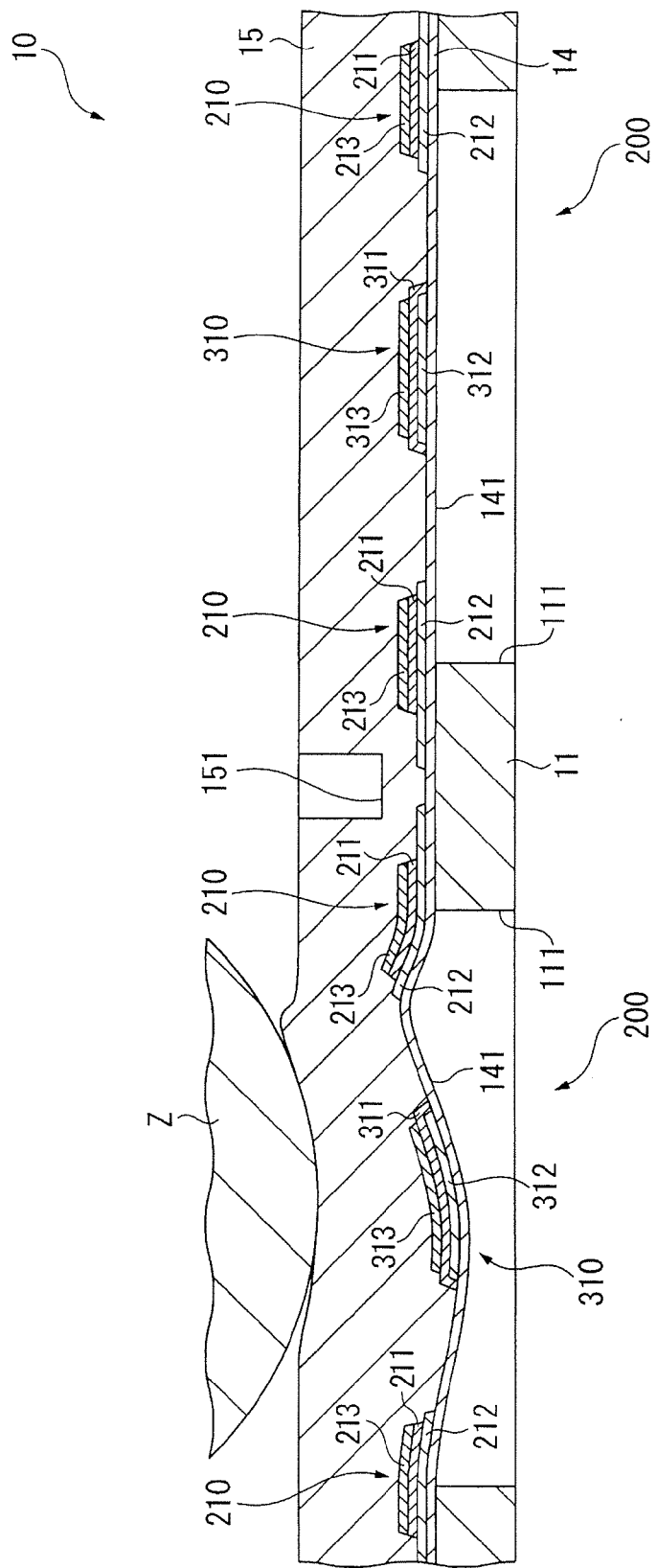
FIG. 9 is a fragmentary sectional view of a tactile sensor.

FIG. 9 is a fragmentary sectional view of the tactile sensor.

As shown in FIG. 8, the tactile sensor 10 is furnished with a plurality of the stress sensing devices 200 according to the first embodiment.

These stress sensing devices 200 are disposed in a matrix arrangement on the sensor substrate 11 that makes up the support body of the present invention. In these stress sensing devices 200, the sensor substrate 11, the support film 14, and the elastic layer 15 are constituted by common members. Specifically, a plurality of openings 111 are formed in a matrix arrangement on a single sensor substrate 11, and a continuous support film 14 is formed over the entire face of one side of this sensor substrate 11. By so doing, membranes 141 are formed covering the individual openings 111, and shear force sensing piezoelectric bodies 210 and a pressing force sensing piezoelectric body 310 are formed on each membrane 141. An elastic layer 15 covering the entire face of the support film 14 is formed over the support film 14.

As shown in FIG. 9, regulating grooves 151 are formed in the elastic layer 15 between the individual stress sensing devices 200. These regulating grooves 151 are formed at a prescribed depth dimension facing towards the support film 14 from the elastic layer 15 on the side thereof intended for contact with objects. Owing to the presence of these regulating grooves 151 in the tactile sensor 10, the elastic layer 15 is divided into sections for the individual stress sensing devices 200, and flexion of the elastic layer 15 for one stress sensing device 200 is not transmitted to the elastic layer 15 of neighboring stress sensing devices 200.

Figure 10:
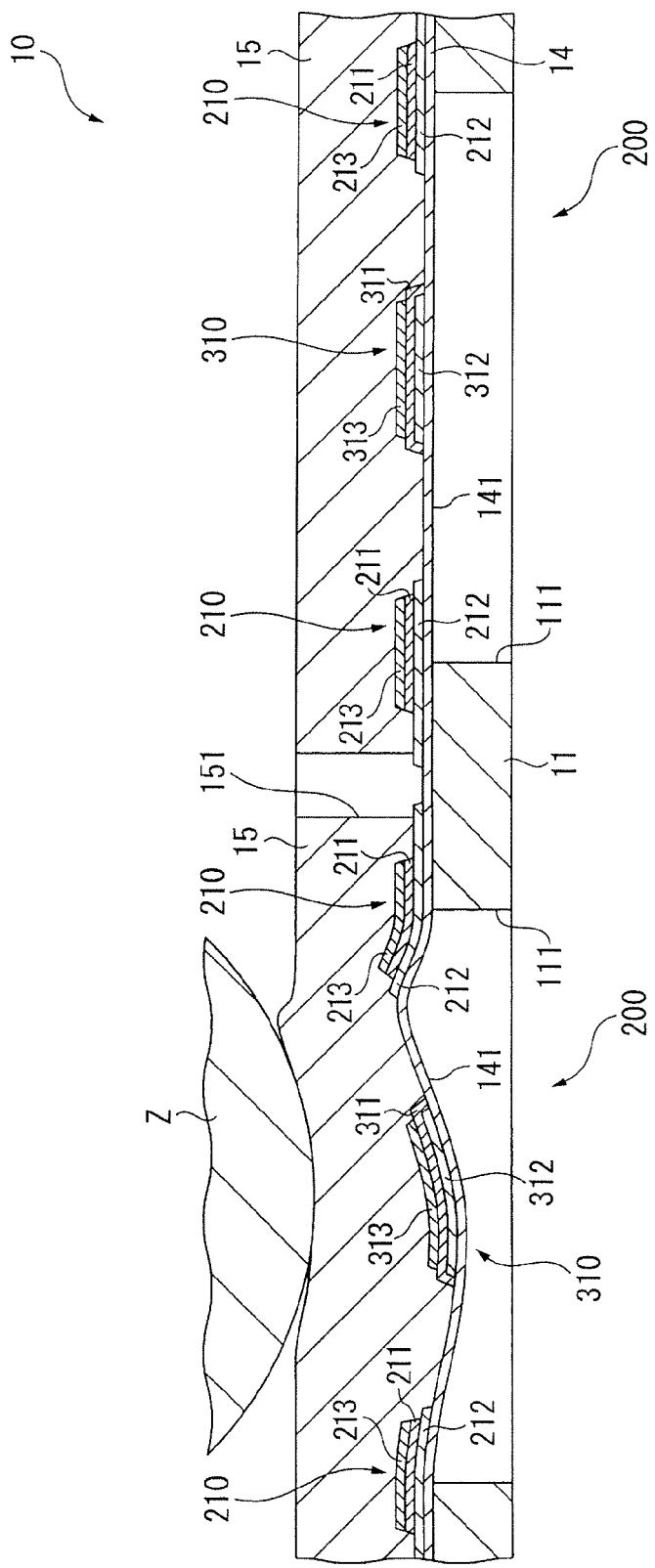
FIG. 10 is a sectional view of a modified example of a tactile sensor.

FIG. 9 depicts an example in which the regulating grooves 151 of the elastic layer 15 are formed with a depth dimension, measured from the contact face intended for contact with objects, that is equivalent to about ¾ the film thickness of the elastic layer 15, for example; however, no limitation is imposed thereby; a configuration like that of FIG. 10, for example is also acceptable. FIG. 10 is a drawing depicting another example of regulating grooves formed in the elastic layer 15.

Specifically, as another acceptable configuration like that shown in FIG. 10, the regulating grooves 151 may be formed extending all the way from the contact face of the elastic layer 15 to the surface of the support film 14. With this arrangement, it is possible to more dependably prevent transmission of flexion of the elastic layer 15 among neighboring stress sensing devices 200.

Furthermore, whereas FIG. 8 depicts an example in which, as seen in a plan view of the sensor, the regulating grooves 151 form rectangular enclosures surrounding the individual stress sensing devices 200, no limitation is imposed thereby; in another acceptable configuration, circular enclosures are formed surrounding the individual stress sensing devices 200, as seen in sensor plan view.

Working Effect of the Second Embodiment

The tactile sensor 10 of the second embodiment described above is furnished with a plurality of stress sensing devices 200, and is configured with a two-dimensional array structure of these stress sensing devices 200 are disposed in a matrix arrangement.

For this reason, by providing this tactile sensor 10, for example, to a sensor face for contacting objects, shear force and pressing force exerted on the sensor face by an object can be sensed.

Moreover, with a sensor formed of an alternating arrangement of shear force sensors and pressing force sensors, for example, it is not possible to detect both shear force and pressing force acting on a single point. For example, pressing force cannot be sensed at locations where sensing devices for sensing shear force are disposed. However, where the configuration employs single stress sensing devices 200 according to the present embodiment, both shear force and pressing force can be sensed at any point in the tactile sensor 10.

Furthermore, with a sensor formed of an alternating arrangement of shear force sensors and pressing force sensors, for example, the region able to sense shear force in each unit of surface area has surface area equivalent to substantially half of the unit surface area, while the region able to sense pressing force occupies the remaining half of the surface area. Also, where sensing devices for sensing shear force in the X direction, sensing devices for sensing shear force in the Y direction, and sensing devices for sensing pressing force are disposed in alternating fashion, the region able to sense X direction shear force, the region able to sense Y direction shear force, and the region able to sense pressing force will respectively occupy ⅓ of the unit of surface area. In contrast, with the tactile sensor 10 of the second embodiment presented above, X direction shear force, Y direction shear force, and pressing force can be sensed throughout substantially the entire surface area of the unit of surface area. Consequently, stress resolution per unit of surface area may be improved, and stress sensing with high accuracy becomes possible.

Additionally, regulating grooves 151 are formed in the elastic layer 15 between neighboring stress sensing devices 200. For this reason, even if the elastic layer 15 experiences flexion in response to stress such as shear force or pressing force applied exclusively to the elastic layer 15 of a particular stress sensing device 200, the problem of this flexion of the elastic layer 15 being transmitted to the elastic layer 15 of neighboring stress sensing devices 200 is avoided. Consequently, shear force and stress acting on any location of the tactile sensor 10 can be sensed correctly.

Third Embodiment

Next, as an application example of a device employing the tactile sensor 10 described above, a grasping apparatus furnished with the tactile sensor 10 is described based on the drawings.

Figure 11:
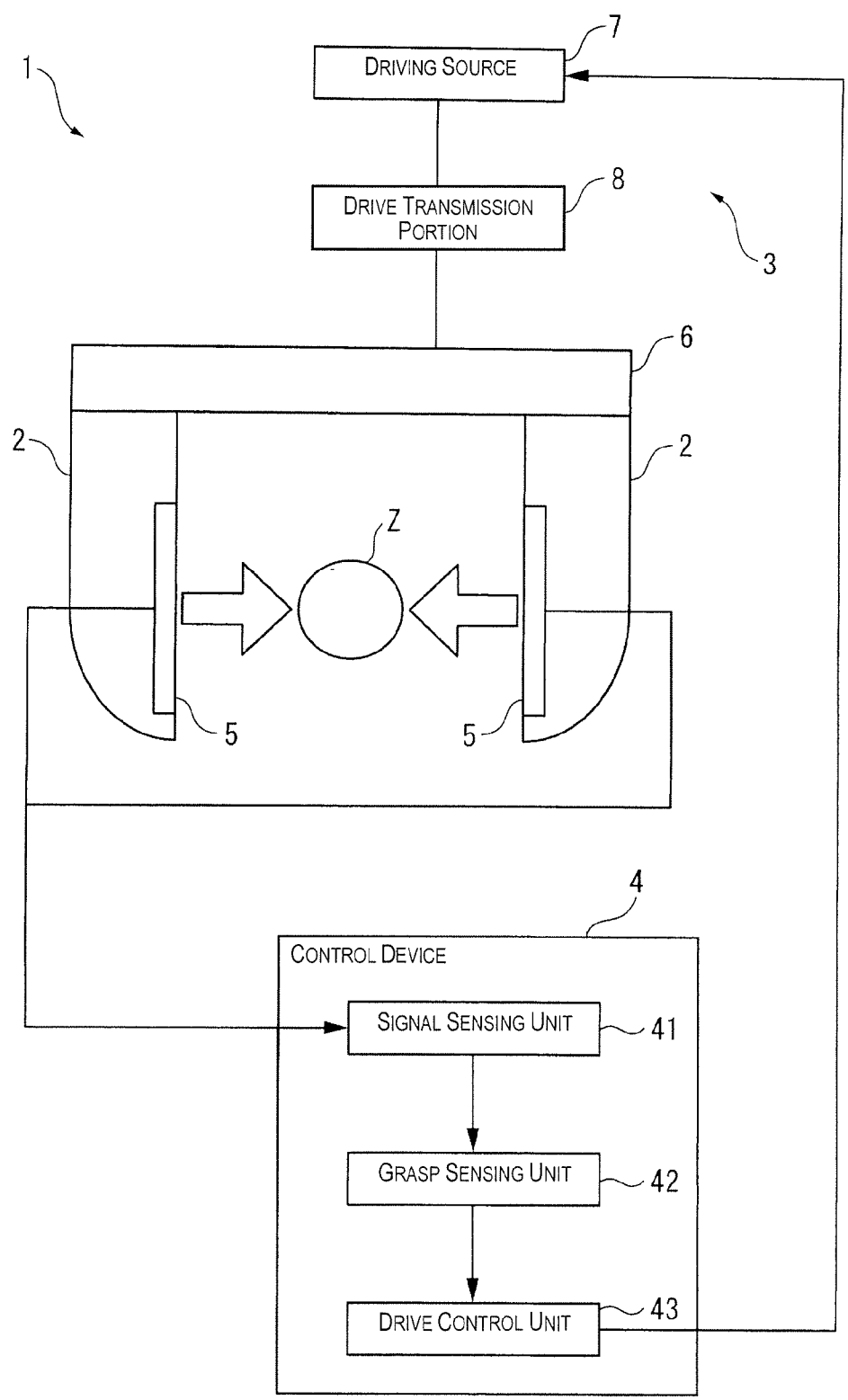
FIG. 11 is a device block diagram depicting a simplified configuration of a grasping apparatus according to a third embodiment of the present invention.

FIG. 11 is a device block diagram depicting a simplified configuration of a grasping apparatus according to a third embodiment of the present invention.

In FIG. 11, the grasping apparatus 1 is a device that includes at least one pair of grasping arms 2, and is adapted to grasp an object Z with the grasping arms 2. This grasping apparatus 1 is intended for use in a manufacturing facility for manufacturing products, for example, and the device is adapted to grasp and pick up objects conveyed by a belt conveyor or the like. This grasping apparatus 1 is composed of the grasping arms 2, an arm driving portion 3 for driving the grasping arms 2, and a control unit 4 for drive control of the arm driving portion 3.

The pair of grasping arms 2 are provided at their respective distal ends with grasp faces 5 that are contact faces, and the grasp faces 5 are adapted to be brought into contact with the grasped object Z to grasp and lift the grasped object Z. While the present embodiment depicts an example of a single pair of grasping arms 2, no limitation is imposed thereby; a configuration in which the grasped object Z is grasped through three-point support by three grasp arms 2, for example would also be acceptable.

The tactile sensor 10 described in the second embodiment is disposed on the surface of the grasp face 5 which is provided to the gripping arm 2, with the elastic layer 15 of the surface portion of the tactile sensor 10 lying exposed. The grasping arm 2 grasps the object Z by bringing this elastic layer 15 into contact with the grasped object Z and applying a prescribed level of pressure (pressing force) to the grasped object Z. With this gripping arm 2, pressing force applied to the grasped object Z and shear force reflecting the tendency of the grasped object Z to slip out from the grasp face 5 during grasping are sensed by the tactile sensor 10 provided to the grasp face 5, and an electrical signal in response to the pressing force and the shear force is output to the control device 4.

The arm driving portion 3 is a device for driving travel of the pair of grasping arms 2 closer together or apart from one another. This arm driving portion 3 includes a retaining member 6 for moveably retaining the grasping arms 2, a driving source 7 for generating drive power for travel of the grasping arms 2, and a drive transmission portion 8 for transmitting drive power of the driving source to the grasping arms 2.

The retaining member 6 is furnished, for example with a guide groove extending in the direction of travel of the grasping arms 2, and by virtue of the grasping arms 2 being retained within this guide groove, the grasping arms 2 are moveably retained thereby. Also, the retaining member 6 is able to travel in the vertical direction.

The driving source 7 employs a driving motor, for example, and generates drive power in response to a drive control signal input from the control device 4.

The drive transmission portion 8 is composed of a plurality of gears, for example, and serves to transmit drive power produced by the driving source 7 to the grasping arms 2 and the retaining member 6, and to impart travel to the grasping arms 2 and the retaining member 6.

In the present embodiment, the configuration above is shown by way of example, and no limitation is imposed thereby. Specifically, it is not contemplated to limit the configuration to one wherein the grasping arms 2 travel along a guide groove provided to the retaining member 6; in another acceptable configuration the grasp arms are retained in rotatable fashion. The driving source 7 is not limited to a driving motor, and another configuration, such as one employing driving by a hydraulic pump, for example, could be adopted; or where the drive transmission portion 8 is employed, there is no limitation to transmission of drive power by gears, and a configuration that instead involves transmission by a belt or chain, for example could be adopted; as could a configuration provided with a hydraulically driven piston.

The control device 4 is connected to the tactile sensor 10 disposed on the grasp face 5 of the grasping arms 2, and to the arm driving portion 3, and controls the entirety of the operation of the grasped object Z being grasped in the grasping apparatus 1.

Specifically, as shown in FIG. 11, the control device 4 is connected to the arm driving portion 3 and the tactile sensor 10, and controls overall operation of the grasping apparatus 1. This control device 4 includes a signal sensing unit 41 for reading shear force sensor signals and pressing force sensor signals input from the tactile sensor 10; a grasp sensing unit 42 for sensing slippage of the grasped object Z; and a drive control unit 43 for outputting drive control signals for drive control of the arm driving portion 3 and the grasping arms 2. This control device 4 may employ a general purpose computer such as a PC, for example, or a configuration that includes an input device such as a keyboard, and a display portion for displaying grasping status of the grasped object Z, for example.

The signal sensing unit 41, the grasp sensing unit 42, and the drive control unit 43 may be stored as programs in a storage portion such as memory, for example, for appropriate loading and execution by a processing circuit such as a CPU; or constituted by an integrated circuit such as an IC adapted to carry out prescribed processes in response to input electrical signals.

The signal sensing unit 41 is connected to the tactile sensor 10, and recognizes pressing force sensor signals and shear force sensor signals input from the tactile sensor 10. The sensor signals recognized by this signal sensing unit 41 are output to a storage portion such as a memory, not shown, where they are saved, and are also output to the grasp sensing unit 42.

Acting based on the shear force sensor signal, the grasp sensing unit 42 determines whether the grasped object Z is grasped by the grasping arms 2.

Figure 12:
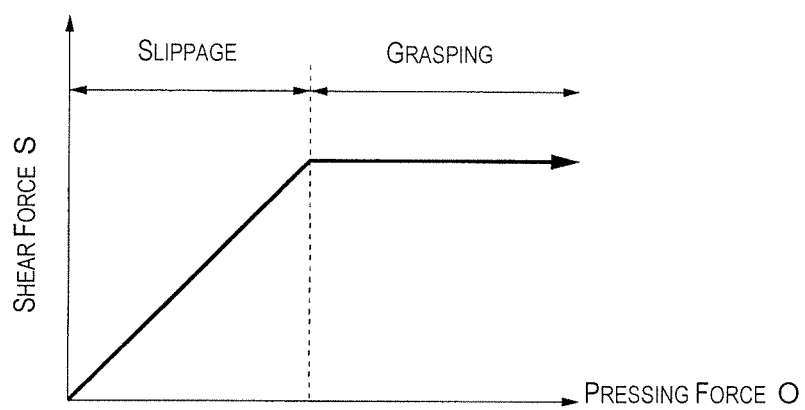
FIG. 12 is an illustration depicting the relationship of pressing force and shear force acting on a tactile sensor during a grasping operation by the grasping apparatus.

FIG. 12 is an illustration depicting the relationship of pressing force and shear force acting on a tactile sensor during a grasping operation of the grasping apparatus 1.

In FIG. 12, up to the point that pressing force reaches a prescribed value, shear force increases in association with increasing pressing force. This condition is one in which dynamic frictional force acts between the grasped object Z and the grasp face 5, and the grasp sensing unit 42 decides that a slippage condition, in which the grasped object Z is not grasped completely and slips out from the grasp face 5, exists, and that grasping is not complete. On the other hand, if pressing force is equal to or greater than the prescribed value, conditions are such that shear force no longer increases with increasing pressing force. This condition represents one in which static frictional force acts between the grasped object Z and the grasp face 5, and the grasp sensing unit 42 decides that a grasped condition, in which the grasped object Z is grasped by the grasp face 5, exists.

Specifically, if the value of the shear force sensor signal exceeds a prescribed threshold value corresponding to static frictional force, it is decided that grasping is complete.

The drive control unit 43 controls operation of the arm driving portion 3 based on electrical signals sensed by the grasp sensing unit 42.

Next, operation of the control device 4 is described based on the drawings.

Figure 13:
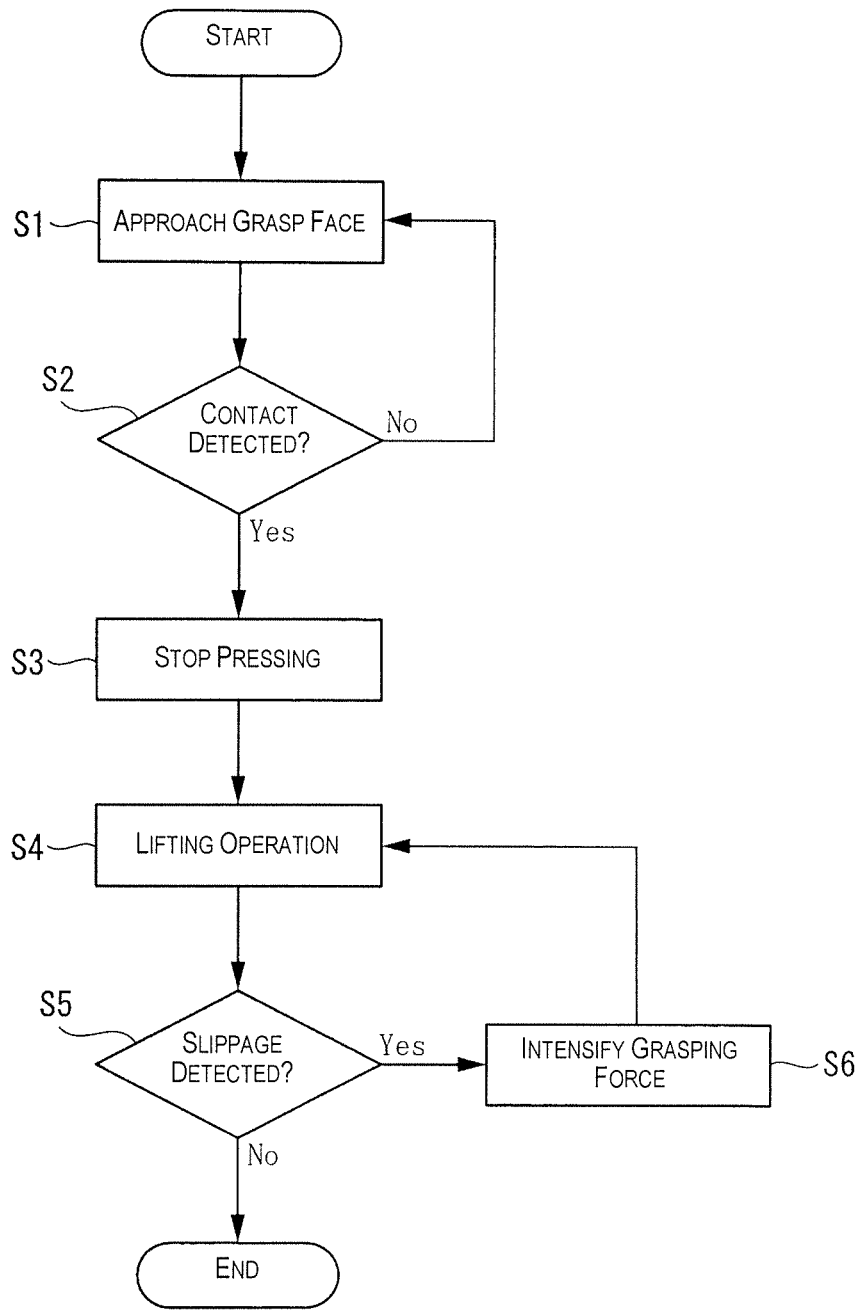
FIG. 13 is a flowchart depicting a grasping operation by the grasping apparatus under the control of the control device.

FIG. 13 is a flowchart depicting a grasping operation by the grasping apparatus 1 under the control of the control device 4.

Figure 14:
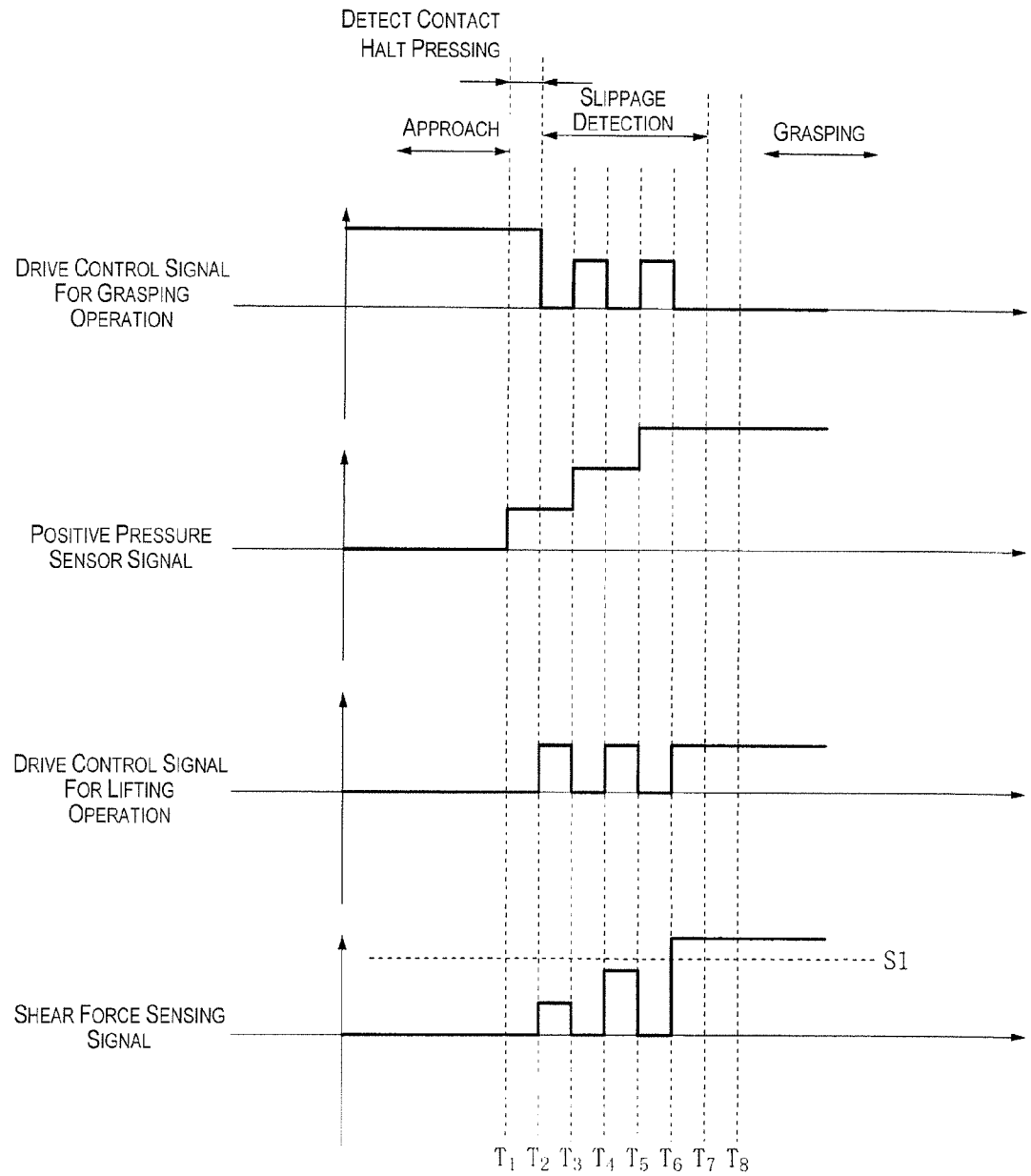
FIG. 14 is a timing chart depicting transmission timing of drive control signals to the arm drive portion, and sensor signals output by the tactile sensor in a grasping operation by the grasping apparatus.

FIG. 14 is a timing chart depicting transmission timing of drive control signals to the arm drive portion 3, and sensor signals output by the tactile sensor 10, in a grasping operation by the grasping apparatus 1.

In order for the grasping apparatus 1 to grasp the grasped object Z, first, the drive control unit 43 of the control device 4 outputs to the arm driving portion 3 a drive control signal to move the grasping arms 2 in the direction towards one another (grasping operation). The grasp faces 5 of the grasping arms 2 thereby approach the grasped object Z (FIG. 13: STEP S1).

Next, the grasp sensing unit 42 of the control device 4 decides whether the grasp faces 5 are in contact with the grasped object Z (FIG. 13: STEP S2). Specifically, the control device 4 decides whether input of a pressing force sensor signal is sensed by the signal sensing unit 41. At this time, the control device 4 outputs a control signal to the stress sensing device 200, places the switching circuit 221 of the output circuit 220 in the switched state for sensing pressing force depicted in FIG. 6B, and instructs that a pressing force sensor signal be output from the arithmetic circuit. At this point, if a pressing force sensor signal is not sensed, a decision is made that the grasp faces 5 are not in contact with the grasped object Z, whereupon the drive control unit 43 continues with STEP S1, and outputs the drive control signal to drive the grasping arms 2.

On the other hand, if the grasp faces 5 are in contact with the grasped object Z (FIG. 14: timing T1), the membrane 141 of the tactile sensor 10 experiences flexion, and a pressing force sensor signal is output in response to the extent of flexion.

Once the pressing force sensor signal is sensed by the grasp sensing unit 42, the drive control unit 43 halts approaching travel of the grasping arms 2 (pressing towards the grasped object Z) (FIG. 13: STEP S3, FIG. 14: timing T2). The drive control unit 43 also outputs a drive control signal to the arm driving portion 3 and carries out an operation of lifting the grasping arms 2 upwards (lifting operation) (FIG. 13: STEP S4, FIG. 14: timing T2-T3). At this time, the control device outputs a control signal to the stress sensing device 200, places the switching circuit 221 of the output circuit 220 in the switched state for sensing shear force depicted in FIG. 6A, and instructs that a shear force sensor signal be output from the arithmetic circuit.

Here, during lifting of the grasped object Z, the elastic layer 15 experiences flexion due to shear force, and the membrane 141 of the stress sensing device 200 experiences flexion as well. Consequently, in response to the flexion a shear force sensor signal is output from the shear force sensing piezoelectric bodies 210 of the stress sensing device 200.

Based on the shear force sensor signal input to the signal sensing unit 41, the grasp sensing unit 42 decides whether slippage is occurring (STEP S5).

At this time, if the grasp sensing unit 42 decides that slippage is occurring, the drive control unit 43 controls the arm driving portion 3 to move the grasping arms 2 in directions such that the grasp faces 5 press against the grasped object Z and grasping force (pressing force) is intensified (FIG. 13: STEP S6).

Specifically, at timing T3 in FIG. 14, the control device 4 causes the drive control unit 43 to perform a grasping operation and increase the force of pressure on the grasped object Z, and the signal sensing unit 41 again senses the shear force sensor signal output from the shear force sensing piezoelectric bodies 210 of the stress sensing device 200. The above slippage sensing operation (timing T2-T6) is repeated in succession, and when the shear force sensor signal is equal to or greater than a prescribed threshold value S1 (timing T6), in STEP S5 the decision is made that there is no slippage, i.e. that grasping is complete, whereupon the slippage sensing operation halts.

Working Effect of the Third Embodiment

The grasping apparatus 1 of the third embodiment disclosed above is furnished with the tactile sensor 10 of the second embodiment disclosed above. As noted, this tactile sensor 10 is able to accurately sense shear force and pressing force at any location, and therefore the grasping apparatus 1 is able to carry out precise grasping operations based on the highly accurate shear force sensor signals and pressing force sensor signals.

Moreover, the tactile sensor 10 is able to sense shear force in both the X direction and Y direction. Consequently, according to the third embodiment, although the shear force is measured while the grasped object Z is lifted, when, e.g., an object conveyed on a belt conveyor is to be grasped, the shear force can be measured in the conveying direction as well.

Additional Embodiments

The scope of the invention is not limited to the disclosed embodiments; various changes and modifications can be made herein while still attaining the objects of the invention.

Figure 15:
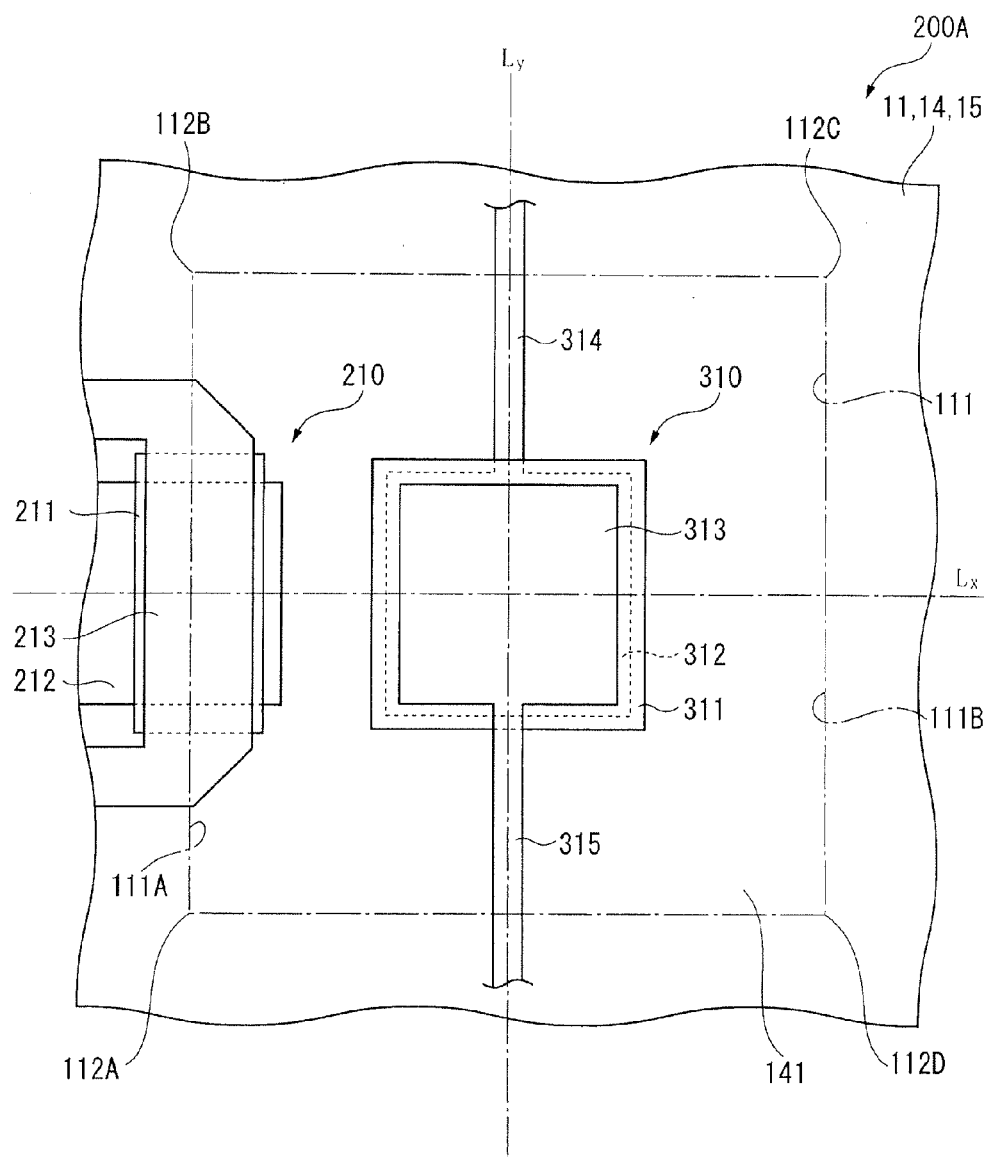
FIG. 15 is a plan view depicting a stress sensing device according to another embodiment.

For example, whereas the preceding first embodiment shows an example of elements able to sense three forces, namely, X direction shear force, Y direction shear force, and pressing force, the stress sensing device may be designed to sense X direction shear force and pressing force only, as shown in FIG. 15.

The stress sensing device 200A shown in FIG. 15 is a sensing device adapted to sense X direction shear force and pressing force, and includes a sensor substrate 11 with an opening 111 having a pair of mutually parallel straight parts (sides 111A, 111B); a support film 14; a shear force sensing piezoelectric body 210; a pressing force sensing piezoelectric body 310; and an elastic layer 15. While FIG. 15 depicts an example in which the opening 111 is formed with a rectangular shape, any shape whereby the membrane 141 gives rise to flexion with a sinusoidal wave profile when shear force is applied in the X direction is acceptable. Consequently, the opening 111 may be formed to have the sides 111A, 111B and curving portions of semicircular shape connecting the two ends of the sides 111A, 111B, for example.

In this stress sensing device 200A, the shear force sensing piezoelectric body 210 is disposed along the side 111A, but no shear force sensing piezoelectric body 210 is disposed along the other side 111B. However, a configuration in which shear force sensing piezoelectric bodies 210 are disposed at each of sides 111A, 111B is acceptable as well.

Further, in this stress sensing device 200A, a pressing force sensing lower electrode portion 314 and a pressing force sensing upper electrode portion 315 which connect to the pressing force sensing piezoelectric body 310 are formed along the line segment Ly which passes through the center of the membrane 141 and parallel to the Y direction.

Because this stress sensing device 200A only senses X direction shear force and pressing force, the pressing force sensing lower electrode portion 314 and pressing force sensing upper electrode portion 315 may be provided at axisymmetrical locations with respect to the line segment Lx parallel to the X direction, which is the sensing direction of the shear force. Consequently, is it possible to employ a configuration whereby, for example, the pressing force sensing lower electrode portion 314 extends towards the −X+Y direction apex 112B of the opening 111, the pressing force sensing upper electrode portion 315 extends towards the −X−Y direction apex 112A of the opening 111, and dummy electrode lines 316A, 316B are provided in the same fashion as in the stress sensing device 200 of the first embodiment, with the electrode lines 314, 315, 316A, 316B being patterned along diagonal lines of the opening 111.

The stress sensing device 200A disclosed above affords working effects comparable to the stress sensing device 200 of the first embodiment, and is able to accurately measure both shear force acting in the X direction on the membrane 141 and pressing force, and affords compact sensor size.

Moreover, whereas the first embodiment hereinabove has a configuration provided with a switching circuit 221 for switching the connection states of the shear force sensing piezoelectric body 210A and the shear force sensing piezoelectric body 210B as depicted in FIG. 6, no limitation thereto is imposed. For example, in other acceptable configurations, the signal values A, B, C, D, E output by the shear force sensing piezoelectric bodies 210A, 210B, 210C, 210D and the pressing force sensing piezoelectric body 310 are respectively output to a processing circuit or control device for performing calculations of shear force and pressing force; and shear force and pressing force are calculated based on Equations (1) to (3) above by the processing circuit or control device.

Also, whereas the center location of the membrane 141 was taught hereinabove as being the location for disposing the pressing force sensing piezoelectric body 310, no limitation thereto is imposed. The pressing force sensing piezoelectric body 310 may be disposed at any location to the inside of the opening 111 and away from the shear force sensing piezoelectric body 210, but in preferred practice the location at which this element is disposed is one that experiences maximum displacement with respect to the film thickness direction when pressing force is uniformly applied to the membrane 141. In the stress sensing device 200 of the preceding first embodiment, displacement is greatest at the center of the membrane 141 when pressing force is applied. Therefore, it is preferable for the pressing force sensing piezoelectric body 310 to be disposed at the center of the membrane 141. On the other hand, where, for example the shear force sensing piezoelectric body 210 is disposed only along one side 111A of the opening 111 and no shear force sensing piezoelectric bodies 210 are disposed at the other sides 111B, 111C, 111D, rigidity becomes higher towards the side 111A of the membrane 141. In this case, where uniform pressing force is imparted, displacement will be greatest towards the side 111B of the membrane 141, and therefore in a preferred configuration the pressing force sensing piezoelectric body 310 is disposed towards the side 111B from the center location of the membrane 141.

As depicted in FIGS. 9 and 10, in the configuration of the second embodiment, regulating grooves 151 are formed in the elastic layer 15 between neighboring stress sensing devices 200, but no limitation thereto is imposed. For example, a configuration that dispenses with forming the regulating grooves 151 is also acceptable, in which case it would be possible to reduce transmission of flexion from the elastic layer 15 of neighboring stress sensing devices 200 by ensuring ample distance among the stress sensing devices 200. In another possible configuration, region separating members of higher rigidity than the elastic layer 15 are provided between neighboring stress sensing devices 200. With such a configuration, as compared with a configuration provided with the regulating grooves 151, flexion of the elastic layer 15 is diminished due to the formation of the high rigidity region separating members about the elastic layer 15, but transmission of flexion of the elastic layer 15 from neighboring stress sensing devices 200 can be reduced.

Furthermore, whereas in the first embodiment there is employed a configuration in which the shear force sensing upper electrode 213 and the shear force sensing lower electrode 212 are disposed at locations such that the electrodes do not overlap one another with respect to the plan view of the sensor, so that contact is made therebetween; however, such a configuration is not employed by way of limitation. For example, in another acceptable arrangement, if an insulating film is formed between the shear force sensing upper electrode 213 and the shear force sensing lower electrode 212, the shear force sensing upper electrode 213 and the shear force sensing lower electrode 212 may be disposed at locations such that there is some overlap between them with respect to the plan view of the sensor.

Also, whereas an example in which the support body of the present invention is composed of a single sensor substrate 11 was disclosed above, in another acceptable arrangement the individual stress sensing devices 200 are provided respectively with a single support substrate (support body), and these support substrates are secured onto a sensor substrate to form the tactile sensor 10.

Furthermore, whereas a configuration in which the grasping apparatus 1 is provided with a pair of grasping arms 2 was disclosed by way of example, in other acceptable arrangements, three or more grasping arms 2 may travel in directions closer to and away from one another to grasp a grasped object Z. Another acceptable configuration includes a driven arm driven by an arm driving portion, and a fixed arm or fixed wall that does not move; and the driven arm travels towards the fixed arm (fixed wall) to grasp objects.

A configuration in which the stress sensing devices 200 are implemented in a grasping apparatus 1 for grasping a grasped object Z was disclosed by way of example; however, no limitation thereto is imposed. For example, the tactile sensor 10 furnished with the stress sensing devices 200 may be implemented in an input device or the like. Where an input device is employed, the device may be incorporated into a notebook computer or PC, for example. In one specific exemplary configuration, the tactile sensor 10 is disposed on the surface portion provided to an input device console of tabular form. With such an input device, as the user moves a finger or stylus over the surface, shear force and pressing force arise in response to these movements. By having the tactile sensor 10 sense this shear force and pressing force, the contact location coordinates and travel direction can be sensed and output as electrical signals.

A detailed description has been provided of the best mode for carrying out the present invention, but the invention shall not be limited thereto. Specifically, whereas the present invention has been shown and described primarily in relation to certain particular embodiments, it will be apparent to those skilled in the art from this disclosure that various changes and modifications of the embodiments disclosed herein can be made without departing from the technical idea and scope of the invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A stress sensing device for sensing a shear force acting in a shear direction and a pressing force perpendicular to the shear direction, the stress sensing device comprising:
   a support body including an opening defined by a pair of straight parts perpendicular to a sensing direction of the shear force and parallel to each other;
   a support film on the support body and closing the opening, the support film having flexibility;
   a first piezoelectric part configured to output an electrical signal by bending, the first piezoelectric part being disposed over the support film and straddling an inside portion and an outside portion of the opening along at least one of the straight parts of the opening as seen in plan view when the support body is viewed from a thickness direction of the support film;
   a second piezoelectric part configured to output an electrical signal by bending, the second piezoelectric part being disposed to the inside portion of the opening and set apart from the first piezoelectric part as seen in the plan view; and
   an elastic layer covering the first piezoelectric part, the second piezoelectric part, and the support film.

2. The stress sensing device according to claim 1, wherein the opening includes a pair of first straight parts and a pair of second straight parts perpendicular to the first straight parts; and
   the first piezoelectric parts are disposed respectively along at least one of the first straight parts and at least one of the second straight parts.

3. The stress sensing device according to claim 1, wherein the first piezoelectric parts are disposed respectively along each of the pair of straight parts.

4. The stress sensing device according to claim 1, wherein the second piezoelectric part is disposed at the center of the opening viewed in the plan view, and
   on the support film, support beams are disposed respectively at locations that, when viewed in the plan view, are symmetrically disposed with respect to a line segment which passes through the center of the second piezoelectric part and extends parallel to the sensing direction of the shear force.

5. The stress sensing device according to claim 4, wherein the opening is formed in a rectangular shape, and
   the support beams are formed on diagonal lines of the opening.

6. The stress sensing device according to claim 4, wherein the second piezoelectric part includes a lower electrode layer formed on the support film, a piezoelectric layer formed on top of the lower electrode layer, and a upper electrode layer formed on top of the piezoelectric layer, and the support beams include a lower electrode line connected to the lower electrode layer, and a upper electrode line connected to the upper electrode layer.

7. A tactile sensor comprising:

a plurality of the stress sensing devices for sensing a shear force acting in a shear direction and a pressing force perpendicular to the shear direction, the stress sensing devices being arranged in an array, each of the stress sensing devices including a support body including an opening defined by a pair of straight parts perpendicular to a sensing direction of the shear force and parallel to each other, a support film on the support body and closing the opening, the support film having flexibility, a first piezoelectric part configured to output an electrical signal by bending, the first piezoelectric part being disposed over the support film and straddling an inside portion and an outside portion of the opening along at least one of the straight parts of the opening as seen in plan view when the support body is viewed from a thickness direction of the support film, a second piezoelectric part configured to output an electrical signal by bending, the second piezoelectric part being disposed to the inside portion of the opening and set apart from the first piezoelectric part as seen in the plan view, and an elastic layer covering the first piezoelectric part, the second piezoelectric part, and the support film.

8. The tactile sensor according to claim 7, wherein the elastic layer of the stress sensing devices includes regulating grooves between the stress sensing devices adjacent to each other, the regulating grooves regulating transmission of flexion through the elastic layer.

9. A grasping apparatus for grasping an object comprising:

a tactile sensor including a plurality of the stress sensing devices for sensing a shear force acting in a shear direction and a pressing force perpendicular to the shear direction, the stress sensing devices being arranged in an array, each of the stress sensing devices having a support body including an opening defined by a pair of straight parts perpendicular to a sensing direction of the shear force and parallel to each other, a support film on the support body and closing the opening, the support film having flexibility, a first piezoelectric part configured to output an electrical signal by bending, the first piezoelectric part being disposed over the support film and straddling an inside portion and an outside portion of the opening along at least one of the straight parts of the opening as seen in plan view when the support body is viewed from a thickness direction of the support film, a second piezoelectric part configured to output an electrical signal by bending, the second piezoelectric part being disposed to the inside portion of the opening and set apart from the first piezoelectric part as seen in the plan view, and an elastic layer covering the first piezoelectric part, the second piezoelectric part, and the support film;

at least one pair of grasp arms configured to grasp the object, the grasp arms having the tactile sensor disposed on a contact face that contacts the object;

a grasp sensing unit configured to sense a slippage state of the object based on the electrical signal output by the tactile sensor; and a drive control unit configured to control driving of the grasp arms based on the slippage state.

\* \* \* \* \*